United States Patent
Madishetti et al.

(10) Patent No.: US 12,436,816 B2
(45) Date of Patent: Oct. 7, 2025

(54) SYSTEM AND METHOD FOR DYNAMIC PROVISIONING OF CLOUD DESKTOP POOLS FROM MULTIPLE PUBLIC CLOUD PROVIDERS

(71) Applicant: Workspot, Inc., Campbell, CA (US)

(72) Inventors: Shiva Prasad Madishetti, Frisco, TX (US); Virabrahma Prasad Krothapalli, San Jose, CA (US); Amitabh Bhuvangyan Sinha, San Jose, CA (US); Jimmy Chang, Mountain View, CA (US); David T. Sulcer, Pacifica, CA (US); Anushree Kunal Pole, Sunnyvale, CA (US); Mahesh Kumar Vojjala, Sunnyvale, CA (US)

(73) Assignee: Workspot, Inc., Campbell, CA (US)

(*) Notice: Subject to any disclaimer, the term of this patent is extended or adjusted under 35 U.S.C. 154(b) by 483 days.

(21) Appl. No.: 18/068,986

(22) Filed: Dec. 20, 2022

(65) Prior Publication Data
US 2024/0202044 A1    Jun. 20, 2024

Related U.S. Application Data

(60) Provisional application No. 63/371,472, filed on Aug. 15, 2022.

(51) Int. Cl.
G06F 9/50    (2006.01)

(52) U.S. Cl.
CPC .......... *G06F 9/5072* (2013.01); *G06F 9/5077* (2013.01); *G06F 2209/5011* (2013.01)

(58) Field of Classification Search
CPC ................. G06F 9/5072; G06F 9/5077; G06F 2209/5011
See application file for complete search history.

(56) References Cited

U.S. PATENT DOCUMENTS

| | | | |
|---|---|---|---|
| 2021/0026661 A1* | 1/2021 | Sulcer | G06F 9/45558 |
| 2021/0103644 A1* | 4/2021 | Madishetti | H04W 12/61 |
| 2021/0349745 A1* | 11/2021 | Kelly | G06F 8/63 |
| 2022/0334903 A1* | 10/2022 | Pole | G06F 16/24558 |

* cited by examiner

Primary Examiner — Sisley N Kim
(74) Attorney, Agent, or Firm — NIXON PEABODY LLP

(57) ABSTRACT

A system and method for providing virtual desktops to client devices of users is disclosed. The system includes available cloud regions that each can provide virtual desktops and associated resources. A desktop pool resource management engine is coupled to the available cloud regions and collects constraint data from the available cloud regions as well as operational data from desktop clients and desktop agents. A cloud usage profile is created for a subset of the users from the operational data. A priority list of available cloud regions for a user in the subset is created based on the usage profile and the constraint data of the available cloud regions. The highest priority cloud region from the priority list is recommended for the user requesting a desktop. A control plane selects the highest priority cloud region according to the priority list to provide the desktop to the client device.

25 Claims, 15 Drawing Sheets

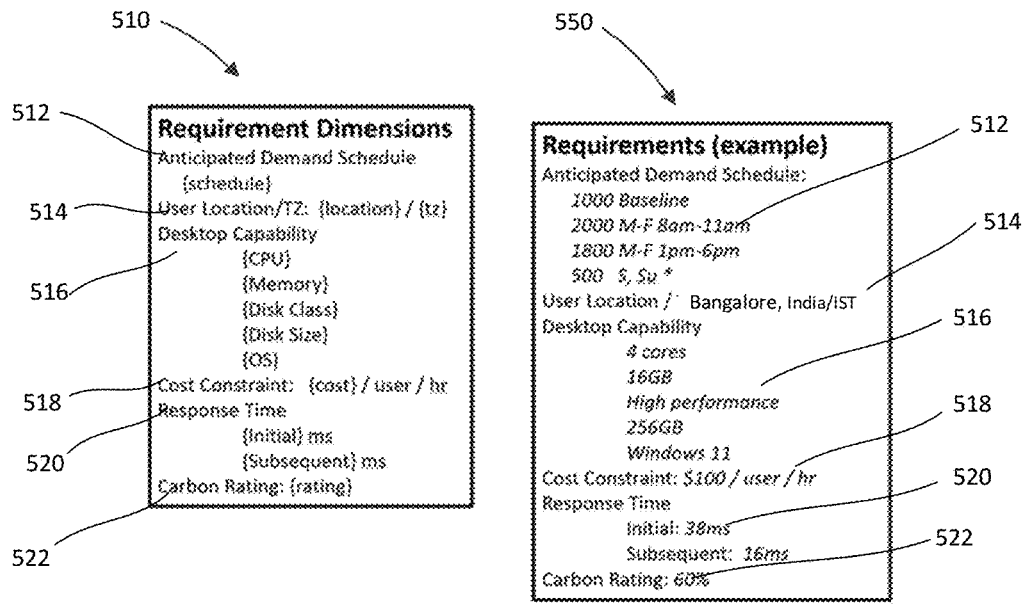

FIG. 7

| Provider | Region | Carbon Rating | Pred. Status | Pred. Capacity | Pred. Init. Latency | Pred. Subs. Latency | Pred. Cost/hr |
|---|---|---|---|---|---|---|---|
| CloudPro | Asia-south | 84% | Green | 1,040 | .38 ms | .16 ms | USD $95 |
| CloudPro | NE Asia-1 | 60% | Green | 1,040 | .38 ms | .16 ms | USD $95 |
| VirtualNet | Central India | 70% | Green | 2,000 | .42 ms | .18 ms | USD $131 |
| VirtualNet | US Central | 70% | Green | 2,000 | .41 ms | .20 ms | USD $96 |
| CloudPro | US West | 90% | Green | 65,000 | .94 ms | .40 ms | USD $120 |

FIG. 8

Provisioning Plan for Call Center use case, Monday 8am PST (Example)

| Time | Provider | Region | Demand |
|---|---|---|---|
| Monday 8am | CloudPro | Asia-south | +1,000 |
| Monday 8am | CloudPro | NE Asia-1 | +500 |
| Monday 8am | VirtualNet | Central India | +500 |
| Monday 8am | VirtualNet | US Central | 0 |

FIG. 9

| Time | Provider | Region | Demand |
|---|---|---|---|
| ~~Monday 8am~~ | ~~CloudPro~~ | ~~Asia-south~~ | ~~+1,000~~ |
| ~~Monday 8am~~ | ~~CloudPro~~ | ~~NE Asia-1~~ | ~~+500~~ |
| ~~Monday 8am~~ | ~~VirtualNet~~ | ~~Central India~~ | ~~+500~~ |
| Monday 8am | VirtualNet | US Central | +2,000 |

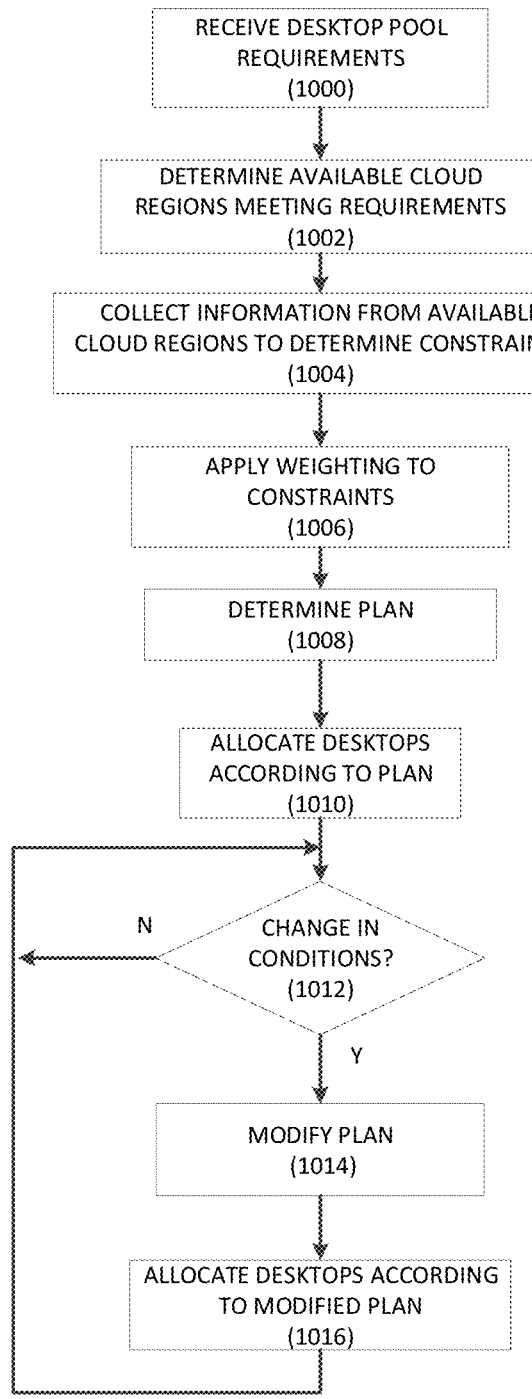

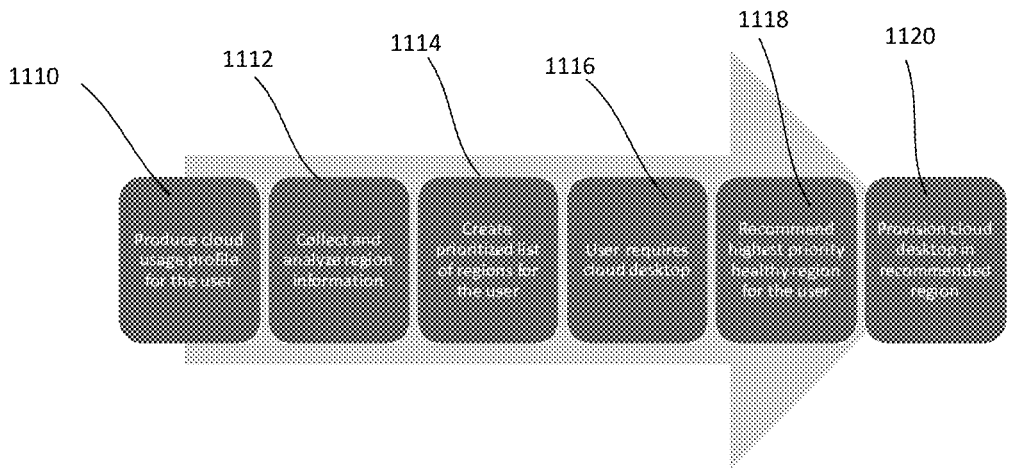

FIG. 12C

1240 → Associate each User with a Profile

| User | Profile |
|---|---|
| U1 | Designer – US (Remote) |
| U2 | Office Admin – US (Office) |
| U3 | Designer – India (Remote) |
| U4 | Call Center – US (Remote) |
| U5 | Call Center – India (Remote) |
| U6 | Designer – US (Remote) |
| U7 | Call Center – India (Office) |
| U8 | Designer – US (Remote) |
| U9 | Office Admin – US (Office) |
| U10 | Call Center – US (Remote) |
| U11 | Call Center – US (Office) |
| U12 | Designer – India (Remote) |
| U13 | Call Center – US (Office) |
| U14 | Call Center – India (Remote) |
| U15 | Call Center – US (Office) |

... for purposes of illustration assume 100x more users following similar pattern

FIG. 12D

1260 → Information Gathered about Available Regions

| Provider | Region | Prod Status | Prod Cost / hr | Carbon Rating |
|---|---|---|---|---|
| CloudPro | US West | Green | USD $104 | 90% |
| VirtualNet | Central India | Green | USD $95 | 84% |
| CloudPro | Asia-south | Green | USD $95 | 60% |
| VirtualNet | US Central | Green | USD $131 | 70% |

Usage Profile-Based Region Recommendations

| Role | Percentage of Users Requesting US West | Percentage of Users Requesting Central India | Percentage of Users Requesting Australia | Percentage of Users Requesting US Central |
|---|---|---|---|---|
| Designer – US (Remote) | 1 | 3 | 4 | 2 |
| Designer – India (Remote) | 3 | 1 | 2 | 4 |
| Call Center – US (Remote) | 2 | 4 | 3 | 1 |
| Call Center – US (Office) | 1 | 4 | 3 | 2 |
| Call Center – India (Remote) | 4 | 2 | 1 | 3 |
| Call Center – India (Office) | 4 | 1 | 2 | 3 |
| Office Admin – US (Office) | 1 | 3 | 4 | 2 |

Prioritized Regions for Each User

| User | Role | Region 1 | Region 2 | Region 3 | Region 4 |
|---|---|---|---|---|---|
| U1 | Designer – US (Remote) | 1 | 3 | 4 | 2 |
| U2 | Office Admin – US (Office) | 1 | 3 | 4 | 2 |
| U3 | Designer – India (Remote) | 3 | 1 | 2 | 4 |
| U4 | Call Center – US (Remote) | 2 | 4 | 3 | 1 |
| U5 | Call Center – India (Remote) | 3 | 1 | 2 | 4 |
| U6 | Designer – US (Remote) | 2 | 3 | 4 | 1 |
| U7 | Call Center – India (Office) | 1 | 3 | 4 | 2 |
| U8 | Designer – US (Remote) | 1 | 3 | 4 | 2 |
| U9 | Office Admin – US (Office) | 1 | 3 | 4 | 2 |
| U10 | Call Center – US (Remote) | 2 | 4 | 3 | 1 |
| U11 | Call Center – US (Office) | 1 | 4 | 3 | 2 |
| U12 | Designer – India (Remote) | 3 | 1 | 2 | 4 |
| U13 | Call Center – US (Office) | 1 | 4 | 3 | 2 |
| U14 | Call Center – India (Remote) | 3 | 1 | 2 | 4 |
| U15 | Call Center – US (Office) | 1 | 4 | 3 | 2 |

...for purposes of illustration assume 100x more users following similar pattern

FIG. 16A

1600 — Identify Shifts by User and Profile

| User | Profile | Shift Preference | Ideal Warmup Time |
|---|---|---|---|
| U1 | Designer – US (Remote) | 8a-4p (M-F) | 7:46a M-F |
| U2 | Office Admin – US (Office) | 8a-4p (M-F) | 7:45a M-F |
| U3 | Designer – India (Remote) | 8a-4p (M-F) | 7:48a M-F |
| U4 | Call Center – US (Remote) | 8a-4p (M-F) | 7:55a M-F |
| U5 | Call Center – India (Remote) | 5p-11p (M-F) | 4:55p M-F |
| U6 | Designer – US (Remote) | 5p-11p (M-F) | 4:55p M-F |
| U7 | Call Center – India (Office) | 5p-11p (M-F) | 4:55p M-F |
| U8 | Designer – US (Remote) | 5p-11p (M-F) | 4:55p M-F |
| U9 | Office Admin – US (Office) | 5p-11p (M-F) | 4:55p M-F |
| U10 | Call Center – US (Remote) | 8a-4p (M-F) | 7:46a M-F |
| U11 | Call Center – US (Office) | 8a-4p (M-F) | 7:45a M-F |
| U12 | Designer – India (Remote) | 8a-4p (M-F) | 7:48a M-F |
| U13 | Call Center – US (Office) | 8a-4p (M-F) | 7:55a M-F |
| U14 | Call Center – India (Remote) | 5p-11p (M-F) | 4:55p M-F |
| U15 | Call Center – US (Office) | 8a-4p (M-F) | 7:55a M-F |

... for purposes of illustration assume 100x more users following similar pattern

FIG. 16B

1620 — Warmup Requirements by Profile

| Profile | Desktops | Bulk Warmup Time |
|---|---|---|
| Designer – US (Remote) | 90 | 7:45a (M-F) PST |
| Designer – India (Remote) | 80 | 8:00a (M-F) IST |
| Call Center – US (Remote) | 150 | 6:00a (M-F) CST |
| Call Center – US (Office) | 450 | 6:45a (M-F) PST |
| Call Center – India (Remote) | 440 | 4:30p (M-F) IST |
| Call Center – India (Office) | 200 | 4:00p (M-F) IST |
| Office Admin – US (Office) | 90 | 8:45a (M-F) CST |

FIG. 16C

1640 — Regional Recommendation for each User in One Profile

| Profile | User | Consistency US West | Consistency Central India | Consistency Anywhere | Consistency US Central |
|---|---|---|---|---|---|
| Designer – US (Remote) | U1 | 1 | 3 | 4 | 2 |
| Designer – US (Remote) | U6 | 2 | 3 | 4 | 1 |
| Designer – US (Remote) | U8 | 1 | 3 | 4 | 2 |

... Some number of additional users associated with this profile

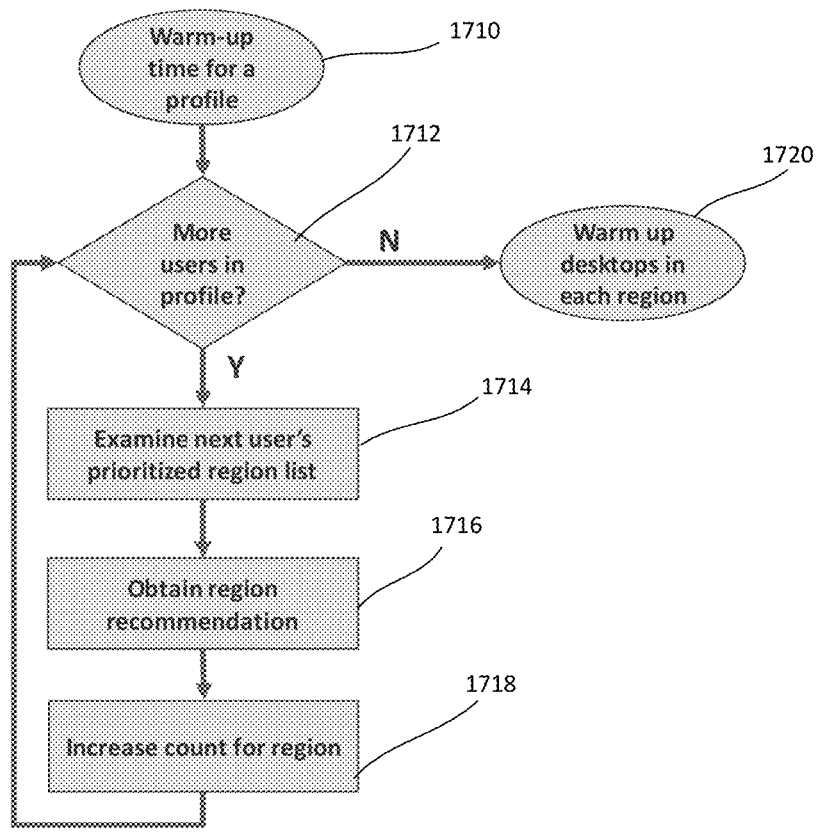

FIG. 19B

1920 — Scenario: fresh desktop provisioned from preferred region

Availability of Warmed-up Desktops

| Pool | Profile | CloudPro / US West | VirtualNet / US Central | VirtualNet / Central India | CloudPro / Asia South |
|---|---|---|---|---|---|
| U1 | Designer – US (Remote) | 0 | 100 | 50 | 75 |

1930 — Sequence of steps

| Step | Result |
|---|---|
| 1932 — U1 requests to connect | |
| 1934 — Examine region by priority | Region 'CloudPro / US West' is considered |
| 1936 — Warmed-up desktop available in region? | No |
| 1938 — Latency-first policy? | Yes |
| 1942 — Region meets criteria? | Yes |
| Provision new desktop | Desktop provisioned in 'CloudPro / US West'. |
| 1944 — | User experiences delay. |
| 1946 — Assign and connect user | User U1 is connected to a low-latency desktop |

FIG. 19C

1950 Scenario: immediate access to desktop in less-preferred region

Availability of Warmed-up Desktops

| Pool | Profile | CloudPro / US West | VirtualNet / US Central | VirtualNet / Central India | CloudPro / Asia South |
|---|---|---|---|---|---|
| U1 | Designer – US (Remote) | 0 | 100 | 50 | 75 |

1960

| Step | Result |
|---|---|
| 1962 — U1 requests to connect | |
| 1964 — Examine region by priority | Region 'CloudPro / US West' is considered |
| 1966 — Warmed-up desktop available in region? | No |
| — Latency-first policy? | No |
| 1968 — Examine region with next priority | Region 'VirtualNet / US Central' is considered |
| 1970 — Warmed-up desktop available in region? | Yes |
| 1972 — Assign and connect user | User U1 is immediately connected to desktop in 'VirtualNet / US Central' |

SYSTEM AND METHOD FOR DYNAMIC PROVISIONING OF CLOUD DESKTOP POOLS FROM MULTIPLE PUBLIC CLOUD PROVIDERS

PRIORITY CLAIM

This application claims priority to U.S. Provisional Application No. 63/371,472, filed on Aug. 15, 2022. The entirety of that application is hereby incorporated by reference.

TECHNICAL FIELD

The present disclosure relates generally to network-based virtual desktop systems. More particularly, aspects of this disclosure relate to a system that provides virtual desktops to users based on dynamic allocation of regional cloud resources.

BACKGROUND

Computing systems that rely on applications operated by numerous networked computers are ubiquitous. Information technology (IT) service providers thus must effectively manage and maintain very large-scale infrastructures. An example enterprise environment may have many thousands of devices and hundreds of installed software applications to support. The typical enterprise also uses many different types of central data processors, networking devices, operating systems, storage services, data backup solutions, cloud services, and other resources. These resources are often provided by means of cloud computing, which is the on-demand availability of computer system resources, such as data storage and computing power, over the public internet or other networks without direct active management by the user.

Users of networked computers such as in a cloud-based system may typically log into a computer workstation or client device and are provided a desktop application that displays an interface of applications and data available via the network or cloud. Such desktop applications will be initially accessed when a user logs in, but may remain active to respond to user operation of applications displayed on the desktop interface. While users may activate the desktop application on any computer on the network, most users work from one specific computer.

Cloud-based remote desktop virtualization solutions have been available for over a decade. These solutions provide virtual desktops to network users with access to public and/or private clouds. In cloud-based remote desktop virtualization offerings, there is typically a capability of associating a remote desktop virtualization template in a particular cloud region with a remote desktop virtualization pool in the same cloud region as part of the general configuration model. This remote desktop virtualization template is customized with the image of the right desktop for a particular remote desktop virtualization use case.

Companies lose revenue when a user cannot access their cloud desktop because of issues out of their control. There is a need in Cloud based computing to provide a cloud desktop in an optimal fashion as defined by requirements, including but not limited to user experience and costs. When needed, a cloud desktop, in the form of an instantiated virtual machine in a specific cloud region, is made available to the end user to reliably fulfill computing requirements. This addresses the desktop availability caused by cross cloud/cross regional issues.

Typically, a cloud desktop service provides a cloud desktop virtual machine to a group of users requiring a particular configuration in the form of a single logical pool of available desktops provisioned on one or more public "cloud provider regions." The term "cloud provider region" is one of the regions where virtual machines can be provisioned from one of multiple public cloud providers or from a private cloud.

Each user can have access to a cloud desktop virtual machine via a client device when needed. The demand for desktops fluctuates based on work patterns. For example, demand may be highest for a given customer at the start of a typical working day in a particular office location, and lowest in the middle of the night. The overall method is to match requirements with cloud provider region constraints in order to derive and execute an on-going provisioning plan for cloud desktops.

Typically, a desktop service provider will manage a pool of virtual desktops that is statically limited to a single cloud provider region. This leads to problematic scenarios. First, the combined demand on a particular cloud provider/region will fluctuate in a manner that can limit the availability of desktops to any one customer. In other words, a customer may use desktops in one region on one day and when they try to recreate them in the same region, resources may not be available due to surge in demand from other customers using the same region, or due to hardware/software/system failures in the region. Second, the demand from any one customer may also fluctuate, because the use case itself may be very dynamic. For example, a call center application can expect to have a large demand at 8 AM at the start of one work shift, with a large reduction in demand during a different work shift. Another scenario is in the case of provisioning a cloud desktop for a group of users under disaster conditions, such as physical lack of access to an office, or lack of access due to a security incident such as virus attacks and "ransom-ware."

There is a need for a cloud based system that automatically provides the optimal choice of cloud and region for providing a desktop to avoid unnecessary costs or lack of availability of virtual resources, based on analysis of information about users and information about cloud regions. Thus, there is a need for a system that provides the capability to efficiently provision and use desktops from multiple cloud providers and regions requiring reduced or no interaction from human operators.

SUMMARY

One disclosed example is a virtual desktop system with available cloud regions that each include desktop agents, gateways, and associated resources for providing a pool of virtual desktops to client devices of users. A monitoring service is coupled to the available cloud regions. The monitoring service is operable to collect constraint data from the available cloud regions and operational data from the desktop agents and the client devices. A desktop pool resource management engine is coupled to the available cloud regions. The desktop pool resource management engine produces a cloud usage profile for at least one subset of the users based on the operational data from desktop agents and client devices. The management engine creates a priority list of the available cloud regions for a user in the subset of the plurality of users based on the usage profile and the constraint data of the available cloud regions. The management engine recommends the highest priority cloud region from the priority list for the user of a client device requesting a desktop. A control plane selects the highest priority cloud region according to the priority list to provide the desktop to the client device.

In another implementation of the disclosed example system, the usage profile is one of a plurality of usage profiles. At least one of the plurality of usage profiles is associated with each of the users. In another implementation, the usage profile includes a user role and a user location. In another implementation, application used by the user usage data determines the user role in the usage profile. In another implementation, the prioritized list is created by analyzing each of the plurality of cloud regions with regard to the suitability for the usage profile and comparing each of the cloud regions in relation to the suitability. In another implementation, the creation of the priority list is based on one of a static configuration specified by an administrator; a statistical method of ranking the regions to optimize specific profiles; a rule-based system, or a machine learning technique, or a combination thereof. In another implementation, the desktop pool resource management engine is operable to determine whether the selected cloud region satisfies a runtime criteria. The next prioritized region is considered if the initial selected region does not satisfy the runtime criteria. In another implementation, the runtime criteria includes one of network health and resource availability. In another implementation, the constraints include at least one of provider, location, carbon rating, predicted status, predicted capacity, predicted initial latency, subsequent latency and cost. In another implementation, the operational data includes at least one of location of the user, duration of connection, and applications used by the desktop. In another implementation, the desktop pool resource management engine is operable to assign a weight to the constraints to express relative importance of the consideration factor. In another implementation, the control plane is operable to determine a change in a condition of the cloud regions. The desktop pool resource management engine is operable to reevaluate the priority list based on the changed conditions. In another implementation, the change in condition is the unavailability of one of the cloud regions. In another implementation, the desktop pool resource management engine is operable to predict the time to warm up a desktop in a region for the usage profile. In another implementation, the desktop pool resource management engine is operable to predict a quantity of desktops to be warmed up in a cloud region for the usage profile. In another implementation, the desktop pool resource management engine creates a warmup plan based on analysis of historical usage by the plurality of users. In another implementation, the desktop pool resource management engine is operable to assign a desktop to the client device of the user; and provide a connection from the user to the assigned desktop based on the priority list of cloud regions. In another implementation, the desktop pool resource management engine includes a run-time latency-first policy that selects a cloud region from the priority list that provides a low-latency connection and a run-time response-first policy that provides a warmed-up desktop in a next available cloud region of the priority list.

Another disclosed example is a method for providing access to virtual desktops in a desktop pool to users operating client devices. Constraint data is collected from available cloud regions via a desktop pool resource management engine coupled to the available cloud regions. Each of the available cloud regions can provide virtual desktops to the client devices via desktop agents, gateways, and associated resources. Operational data from the desktop clients and desktop agents is collected. A cloud usage profile is created for at least a subset of the users based on the collected operational data from the desktop agents and client devices. A priority list of the available cloud regions for a user is created based on the usage profile and the constraint data of the available cloud regions. The highest priority cloud region from the priority list is recommended for a user of a client device requesting a desktop. The highest priority cloud region according to the priority list is selected to provide the desktop to the client device.

In another implementation of the disclosed example method, the method includes predicting a quantity of desktops to warm up and a time to warm up desktops in a cloud region for the usage profile. At least one of the plurality of usage profiles is associated with each of the users. In another implementation, the example method includes creating a warmup plan based on analysis of historical usage by the plurality of users. In another implementation, the example method includes assigning a desktop to the user; and providing a connection from the client device of the user to the assigned desktop based on the priority list of cloud regions. In another implementation, selecting a cloud region is based on a run-time latency-first policy that provides a cloud region that provides a low-latency connection. In another implementation, selecting a cloud region is based on a run-time response-first policy that provides a warmed-up desktop in a next available cloud region.

Another disclosed example is a non-transitory computer-readable medium having machine-readable instructions stored thereon. When executed by a processor, the instructions cause the processor to collect constraint data from available cloud regions via a desktop pool resource management engine coupled to the available cloud regions. Each cloud region can provide virtual desktops to client devices through desktop agents and associated resources. The instructions cause the processor to create a cloud usage profile for at least a subset of users of the client devices based on the operational data from the desktop agents and client devices. The instructions cause the processor to collect operational data from the desktop clients, gateways, and desktop agents and create a cloud usage profile for at least a subset of the plurality of users. The instructions cause the processor to create a priority list of the available cloud regions for a user based on the usage profile and the constraint data of the available cloud regions. The instructions cause the processor to recommend the highest priority cloud region from the priority list for a user of a client device requesting a desktop and select the highest priority cloud region according to the priority list to provide the desktop to the client device.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 5 is a table of example requirements for an example logical desktop pool and example values for the requirements;

FIG. 6 is a table of weighting for different constraints for selecting a cloud region;

FIG. 7 is a table of constraints for each of the possible cloud regions for the example pool;

FIG. 8 is an example provisioning plan for the example pool;

FIG. 9 is an example of adjusting the provisioning pool in FIG. 8 due to changed conditions;

FIG. 10 is a flow diagram of the routine of providing instantiated desktops using multiple instantiated desktop resources;

FIG. 11 is a flow diagram for a process to produce a prioritized list of specific regions out of a set of possible regions to be used to provision a cloud desktop;

FIG. 12A is an example table of information collected from users according to the process in FIG. 11;

FIG. 12B is an example table of derived profiles based usage patterns determined from the table in FIG. 12A;

FIG. 12C is an example table of association with users in a desktop pool with a profile listed in FIG. 12B;

FIG. 12D is an example table of information gathered about available Cloud region in the process in FIG. 11;

FIG. 13A is a table listing an example user profile bases and regional recommendations for each user;

FIG. 13B is a table of example user priority assignments for different cloud regions;

FIG. 16A shows a table of predictions for users based on analysis of collected operational data;

FIG. 16B shows a table of an example of assignments of bulk warm-up times for each profile;

FIG. 16C shows a table of information supporting resolution of activities;

FIG. 16D shows tables that include an immediate warm-up plan or a warm-up plan that is scheduled;

FIG. 17 is a flow diagram of an example routine to discover region recommendations for each user;

FIG. 19B are tables that show the process when a warmed up desktop is unavailable but a latency policy is in effect;

FIG. 19C are tables that show the process when a warmed up desktop is not available in the highest priority region, but no latency policy is in effect.

Figure 1:
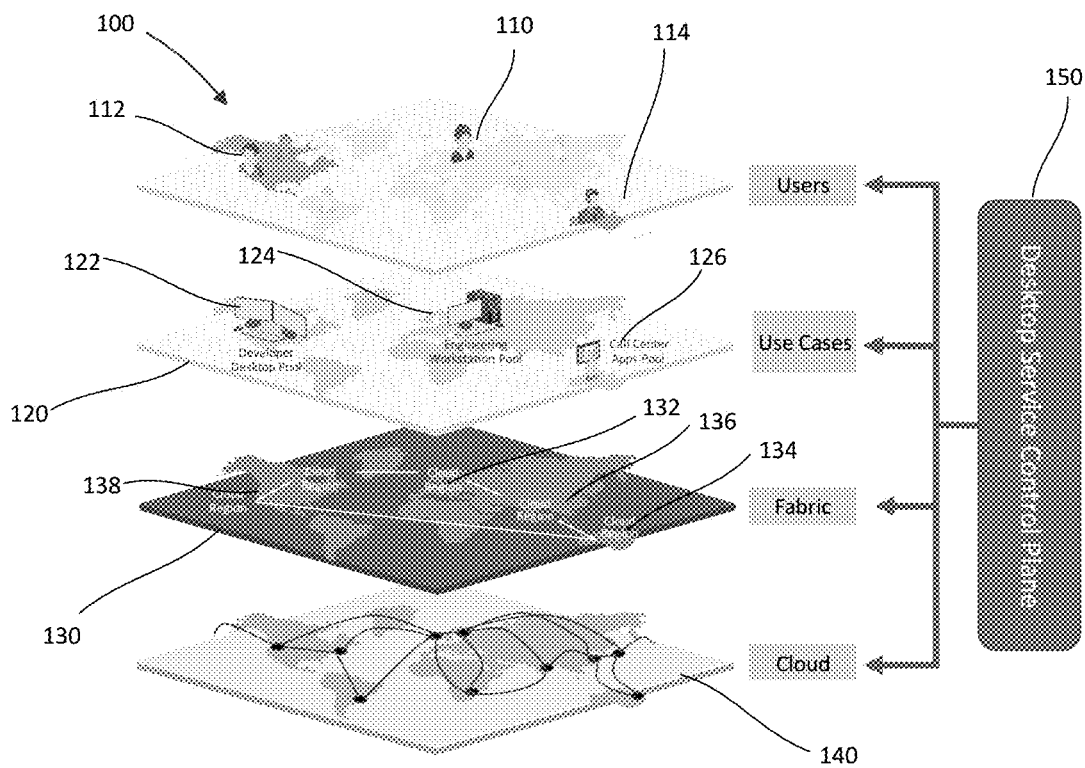
FIG. 1 is a high-level block diagram illustrating an example cloud based system allowing access to virtual desktops from different cloud providers.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a method and system for provisioning and managing virtual desktops from cloud region resources based on information about users and about cloud regions.

The following are definitions of terms used in this disclosure that relate in general to the virtual desktop management system.

An agent is software that performs certain operations and monitoring tasks that has direct access to, or runs on, some virtual computing resource and may maintain a duplex communication channel with a desktop service control plane.

An API is a set of specific, controlled, well-defined functional entry points to get, create, update, and delete resources and otherwise change the state of a remote system.

A cloud API is, in this context, an API specific to a cloud service provider.

A connection broker is desktop service resource sometimes used to dynamically connect desktop clients with desktops.

A cloud provider, also known as a cloud service provider, in this context, is an Infrastructure as a Service provider (IaaS) that provides virtual machines as a service in one or more cloud regions.

A cloud region is a collection of computing resources, such as virtual machine hosts, virtual networks, virtual storage devices, protocol gateways, servers, or other infrastructure in one physical location. The virtual resources are abstractions available to cloud customers, actually implemented by physical hardware such as networking equipment including but not limited to routers, hubs, switches, persistent storage devices such as disks, CPU and/or GPU processors, random access memory (RAM), security appliances including firewalls, operating system software, and other components that may be employed in a cloud regional data center to provide a hosting environment for virtual machines, sometimes known as a "server", "host", or "node." A cloud region is typically described as being part of a public cloud, all the descriptions of the functionality apply equally to a private cloud whose availability is restricted to certain organizations.

A cloud availability zone is an isolated location within a cloud region, with some services that are redundant to other cloud availability zones within the same cloud region, in order to provide a higher level of availability in the event of an outage in a one location. A cloud service provider may allow resources such as virtual machines to be provisioned in a multiple specific availability zones, or may manage logical resources to be spread across availability zones automatically based on availability requirements, such as requiring that cloud resources are still available in the event of a power outage in one zone.

A virtual desktop is the information and capability needed to instantiate and manage, whenever needed, a specific virtual machine providing interactive desktop software or applications, or other experiences provided by remote desktop virtualization via a desktop service utilizing a cloud region.

A pool is a configuration object that describes a collection of virtual desktops, that is associated with a group of cloud desktop users, and certain attributes they have in common. For example, it may describe the common icon image used to launch a desktop.

A client, or desktop client (sometimes called a VDI client) is a software application that provides display and input access to a desktop as part of a desktop service. It may be installed on a standard desktop or mobile operating system, or be pre-installed on dedicated hardware devices, or downloaded dynamically via a web browser application, or deployed in some other way. Like an agent, it may also perform certain operations and monitoring tasks and may maintain a duplex communication channel with a desktop service control plane.

A cloud desktop fabric is a scalable virtual desktop interface system that orchestrates multiple regional fabric regions to allow a user anywhere to access a virtual desktop interface.

A desktop service resource refers to some virtualized hardware, networking service, or virtual machine, other than the desktops themselves, that exists to support a desktop service for use by cloud desktop users.

A desktop service is remote desktop virtualization hosted on a public or private cloud, provided as a turnkey managed service.

A desktop service control plane is an application that implements and manages a desktop service.

A cloud desktop user, also referred to as user, is a person who uses a cloud desktop.

An enterprise connector is a desktop service resource used to integrate the network of a desktop service with the network services, including but not limited to directory services that support authentication and authorization.

A gateway, sometimes referred to as a protocol gateway, is a type of desktop service resource running a service that manages secure access to a desktop supporting protocols including a remote display protocol (RDP). In this disclosure, gateways are accessed as a gateway cluster unless explicitly noted otherwise.

A gateway cluster is a set of gateways managed together for load balancing purposes.

Infrastructure as a service (IaaS) is a set of virtualized computing resources available from a cloud service provider.

An infrastructure template is a collection of desktop service resources and/or definitions that provide a blueprint for replicating a cloud region's resources.

A multi-tenant desktop service control plane is a single desktop service control plane implementation that is used by multiple customers in such a way that no single customer is aware of or is impacted by activities of the others.

The term "near-real-time" refers to the processing time-frame of a system in which root cause information is produced without significant delay, close enough in time from the triggering events to be acted upon immediately to achieve business goals, typically measured as under one minute.

Remote desktop virtualization is software technology that separates the desktop environment and associated application software from the physical client device that is used to access it in a client/server environment.

A virtual application is the capability to access a user experience for a particular application running remotely.

A virtualized computing resource is a virtual machine that is created by an Infrastructure as a Service (IaaS) provider.

A virtual machine is an emulation of a physical computer that can be accessed over a network.

A virtual network is hardware and software network resources combined into a single, software-based administrative entity, made available by an Infrastructure as a Service (IaaS) provider.

Virtual storage is storage resources provided as part of Infrastructure as a Service.

The present disclosure relates to systems and methods to provide efficient desktop services to users. One example is a method to produce a provisioning plan including a schedule, a prioritized list of specific regions out of a set of possible regions to be used to provision a cloud desktop, and a target number of desktops to be provisioned for each region. Another example is a method to produce a prioritized list of specific regions out of a set of possible regions to be used to provision a cloud desktop for a particular user, whenever so requested, allowing the cloud desktop to be provisioned on-demand in the highest priority region for that particular user. Another disclosed aspect is to aggregate the recommendations produced by the prioritized list for multiple users, to create a provisioning plan indicating those regions in which to warm-up quantities of cloud desktops at different times, to improve user experience. Another disclosed example is an initial connection of a user to a cloud desktop that may be provisioned, possibly warmed-up, and otherwise made available using the other described techniques.

FIG. 1 shows a high level block diagram of a cloud desktop service system 100. The cloud desktop service system 100 may also be referenced as a global desktop system because it provides virtual desktops for users globally. The cloud desktop service system 100 includes four layers, a users layer 110, a use cases layer 120, a fabric layer 130, and a cloud layer 140.

The users layer 110 represents desktop users having the same computing needs, that may be located anywhere in the world. In this example, the users layer 110 includes users 112 and 114, who are in geographically remote locations and access desktops via computing devices.

The use cases layer 120 represents common global pools of desktops available to serve the users, whereby each global pool is based on a common desktop template. There can be multiple global pools based on which groups users belong to and their job requirements. In this example, the pool for the users 112 and 114 may be one of a developer desktop pool 122, an engineering workstation pool 124, or a call center application pool 126. The desktops each include configuration and definitions of resources necessary to offer the desktop. The use cases layer 120 represents common logical pools of desktops available to serve the users, whereby each logical pool may be based on common desktop requirements. There can be multiple logical pools based on which groups users belong to and their job requirements. In this example, the pool for the users 112 and 114 may be one of a developer desktop pool 122, an engineering workstation pool 124, or a call center application pool 126. The desktops each include configuration and definitions of resources necessary to offer the desktop. The desktops in a particular pool may each be supported by different cloud regions based on the requirement of the desktop pool.

For example, pools such as the developer desktop pool 122 or the engineering workstation pool 124 allow users in the pool a desktop that allows access to graphic processing unit (GPU) based applications. Other example applications may include those applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Applications associated with an enterprise may include productivity applications, for example, word processing applications, search applications, document viewers, and collaboration applications. Applications associated with an enterprise may also include applications that allow communication between people, for example, email, messaging, web meetings, and so on.

The fabric layer 130 includes definitions and configurations for infrastructure and desktop service resources, including gateways, desktop templates, and others that are applied to cloud regions. The resources are maintained as cloud regions such as cloud regions 132, 134, 136, and 138. The cloud regions can be added or removed as needed.

The cloud layer 140 implements the resources defined by the use case layer 120 and fabric layer 130, including virtual desktops, infrastructure, and other virtual resources, all of which are virtual machines or other virtual resources hosted in a public cloud.

The layers 110, 120, 130, and 140 are created and orchestrated by a desktop service control plane 150 that can touch all the layers. The desktop service control plane 150 is a key component to orchestrate a cloud desktop service system such as the cloud desktop service system 100 in FIG. 3. The desktop service control plane 150 can manage the entire lifecycle of a desktop service implementation, from creating and managing the required desktops, to monitoring and analyzing the stream of operational data collected, enforcing security policies, and optimizing the experience for IT administrators and desktop users. For example, the desktop service control plane 150 may register a set of a virtual networks, virtual storage resources, and more. Within a virtual network, the control plane 150 may further register and coordinate the use of gateways, enterprise connectors, desktop templates, connection brokers, and more.

The two desktop users 112 and 114 in different parts of the world who are each able to access an example high-performance desktop service from the cloud desktop service system 100. Users, such as users 112 and 114, each may use a client device to access the desktop service. Client devices may be any device having computing and network functionality, such as a laptop computer, desktop computer, smartphone, or tablet. Client devices execute a desktop client to access remote applications such as the desktop. The client application authenticates user access to the applications. A client device can be a conventional computer system executing, for example, a Microsoft™ Windows™-compatible operating system (OS), Apple™ OS X, and/or a Linux distribution. A client device can also be a client device having computer functionality, such as a personal digital assistant (PDA), mobile telephone, tablet, video game system, etc. In this example, the client application displays an icon of the desktop or desktops available to the user. As will be explained, the desktop is made available to the user through the client application on the user device.

Figure 2:
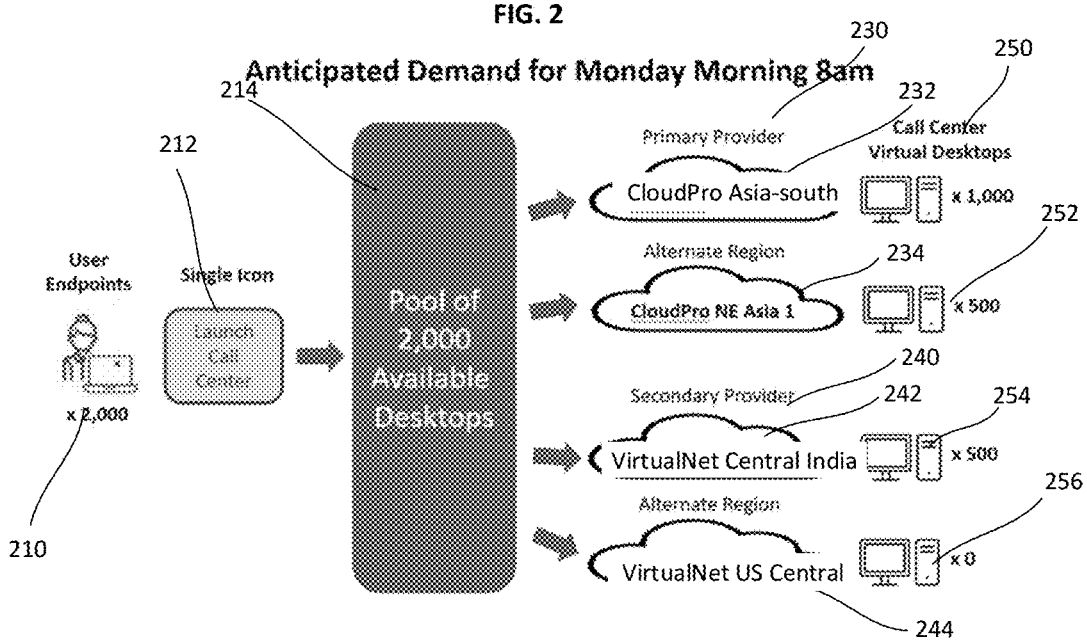
FIG. 2 is a diagram of provision of virtual desktops in a desktop pool from different cloud providers.

FIG. 2 illustrates that the demand for a certain kind of virtual machine can be satisfied by an example provisioning plan spanning cloud provider regions. In FIG. 2, a set of users 210 access a single icon 212 on respective client devices to access a pool of desktops 214. In this example, there are 2000 users that thus require 2000 desktops in the pool 214. As will be explained, the example system allocates desktops from virtual desktops provided through two fictional public cloud providers, "CloudPro" 230 and "VirtualNet" 240 for the logical pool 214. Each of the Cloud providers 230 and 240 may have different clouds and regions. For example, the cloud provider 230 has a primary provider region 232 and an alternate region 234. The cloud provider 240 has a primary provider region 242 and an alternate region 244. In this example, the system allocates the 2000 desktops in the pool 214 between the cloud provider 230 and the cloud provider 240. Thus, a first group 250 of 1000 desktops in the pool are provided by the primary provider region 232 while a second group 252 of 500 desktops in the pool are supported by the alternate region 234. The additional 500 desktops in a third group 254 of the pool are supported by the cloud provider 240 through the primary region 242. In this configuration, the secondary region 244 is not used and thus does not provide any desktops for the pool. As will be explained, the example system determines different requirements for the pool of desktops 214 and determines constraints of available cloud regions to plan the distribution of desktops among the available cloud regions.

Figure 3:
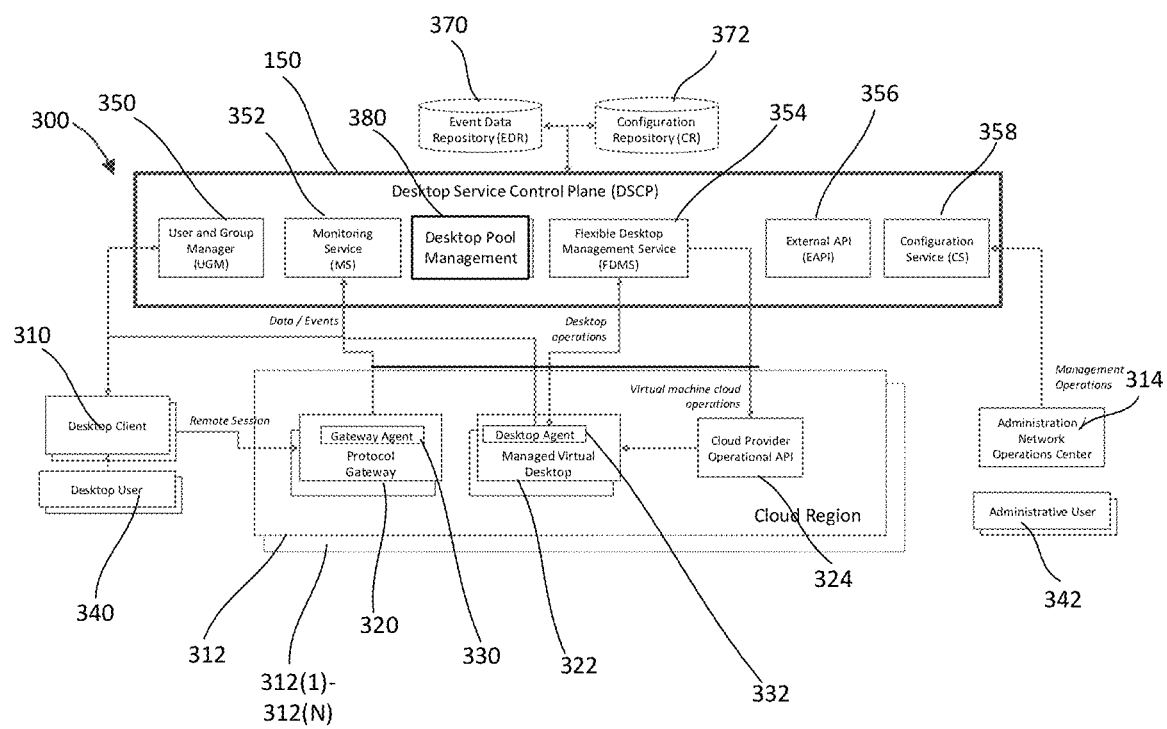
FIG. 3 is a block diagram of a cloud region and desktop service control plane of the example cloud desktop fabric in FIG. 1.

FIG. 3 is a block diagram of some examples of components of the cloud desktop service system 100, including an example set of desktop clients 310, a cloud region 312, and an administration center 314, that interact with and can be orchestrated by the desktop service control plane 150. The desktop client 310 communicates with the desktop service control plane 150 in order to be registered with the fabric, assigned a desktop, remotely configured, and for other purposes. One other purpose is to monitor latency, response-time, and possibly other data and events that measure quality of user experience. Another purpose is to report user interaction events. There may be multiple cloud regions (e.g., cloud regions 312(1) to 312(N)) similar to the cloud region 312, but only one cloud region 312 is shown in detail for simplicity of explanation. The cloud region 312 may include a set of protocol gateways 320, a set of managed virtual desktops 322, and a cloud service provider operational API 324. These components all communicate with the desktop service control plane 150. The cloud region 312 may be one of the cloud regions 132, 134, 136, and 138 in FIG. 1.

Such cloud regions include servers that host the various applications as well as appropriate storage capabilities, such as virtual disks, memory, and network devices. Thus, the cloud region 312 typically comprises IT infrastructure that is managed by IT personnel. The IT infrastructure may include servers, network infrastructure, memory devices, software including operating systems, and so on. If there is an issue related to an application reported by a user, the IT personnel can check the health of the infrastructure used by the application. A cloud region may include a firewall to control access to the applications hosted by the cloud region. The firewall enables computing devices behind the firewall to access the applications hosted by the cloud region, but prevents computing devices outside the firewall from directly accessing the applications. The firewall may allow devices outside the firewall to access the applications within the firewall using a virtual private network (VPN).

The protocol gateway 320 may be present to provide secure public or internal limited access to the managed virtual desktops, that may be deployed on a virtual machine of its own. A gateway agent 330 is software that is deployed on that gateway virtual machine by the desktop service control plane 150, and serves to monitor the activity on the gateway 320, and enable the desktop service control plane 150 to assist in configuration and operations management of the gateway 320.

The example desktop client 310 is software and device hardware available in the local environment of a desktop user 340 to remotely access a managed virtual desktop using a remote desktop protocol. The desktop client 310 communicates with the desktop service control plane 150 to monitor latency, response-time, and other metrics to measure quality of user experience and also supports a remote display protocol in order for users to connect to a desktop application run by the cloud region 312.

The managed virtual desktop 322 is itself provisioned and maintained by the desktop service control plane 150. A desktop template may be used to manage pools of such managed virtual desktops. The desktop template is used to instantiate virtual desktops with the correct virtual machine image and a standard set of applications for a particular use case. A desktop agent such as desktop agent 332 is software that is deployed on that managed virtual desktop by the desktop service control plane 150, and serves to monitor the activity on the managed virtual desktop, and enable the desktop service control plane 150 to assist in configuration and operations management of the managed virtual desktop.

The cloud service provider operational application programming interface (API) 324 presents services provided by the cloud service provider that also participate in the management of the virtual machine. This can be utilized by a desktop service control plane 150 to perform operations like provisioning or de-provisioning the virtual machine.

Administrative users 342 can interact with operations reporting interface software at the administration center 314 that allows management and administration of the desktop service control plane 150.

Other components and services may interact with the desktop service control plane but are omitted from FIG. 3 for simplicity, such as enterprise connectors, network monitoring services, customer relationship management (CRM) systems, and many others.

The desktop service control plane 150 itself can perform many internal centralized functions also not depicted in in FIG. 3, including pool management, user and group management, cloud service adapters, virtual desktop templates, data analysis, high-availability management, mapping users to the optimal cloud region, security policy management, monitoring, compliance, reporting, and others.

The control plane 150 includes a user and group manager 350, a monitoring service 352, a desktop management service (DMS) 354, an external API (EAPI) 356, and a configuration service (CS) 358. The control plane 150 may access an event data repository 370 and a configuration repository 372. Although only one cloud region 312 is shown in detail, it is to be understood that the control plane 150 may facilitate numerous cloud regions.

The monitoring service 352 makes both routine and error events available to administrators and can analyze operational performance and reliability. The monitoring service 352 interacts with components including the desktop client 310, desktop agent 330, gateway agent 332 to obtain operational data relating to the desktop, and operational data generated by the control plane 150 itself. The monitoring service 352 stores all such operational data for later analysis. As will be explained desktop clients may report information about the location of the user. Desktop agents can report information about the duration of each connection, and other performance information, including the applications used by the desktop. Gateway agents can also report performance information because the gateway agent sits between the desktop client and the desktop on the network.

The desktop management service 354 interacts with the one or more managed virtual machines (MVMs) 322 in the cloud region 312 and other regional cloud regions 312(1) to 312(N). In this example, the desktop management service 354 manages resources for providing instantiated desktops to the users in the logical pools, orchestrating the lifecycle of a logical desktop. As will be explained, the management service 354 includes a desktop pool resource management engine 380. The desktop pool resource management engine 380 determines the requirements for desktop pools and the constraints of the regional cloud regions for optimal allocation of desktops in the desktop pool, and may use the data collected by the monitoring service to determine optimal allocation of virtual desktops.

The administration center 314 works directly with the data control plane 150 as its primary human interface. The administration center 314 allows the administrative user 342 to configure the functions of the control plane 150 through the configuration service 358. The configuration service 358 supports editing and persistence of definitions about the desktop service, including subscription information and policies. The administration center 314 may be where the desktop requirement dimensions are configured by the administrative user 342. The system 300 in FIG. 3 allows the creation and management of desktop pools in accordance with the process described herein.

Figure 4:
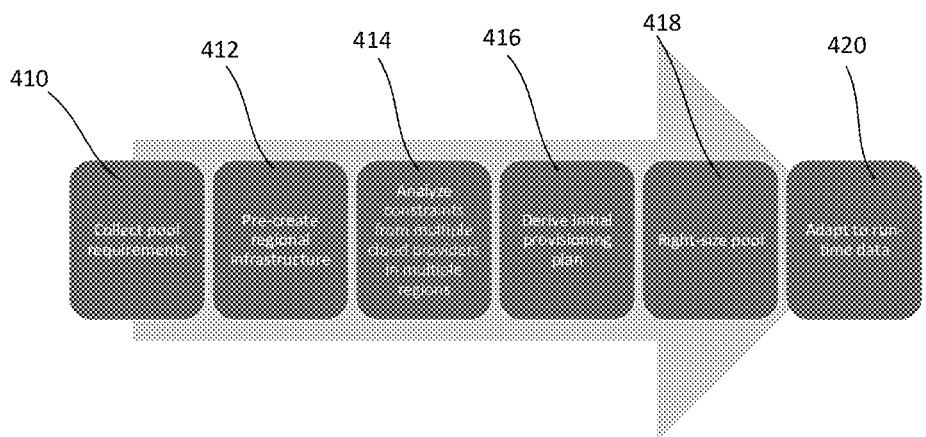
FIG. 4 is a flow diagram of the general process of desktop pool creation and virtual desktop assignment.

FIG. 4 shows an example sequence of determining requirements for providing desktops from the pool 214 to the users 210 in FIG. 2 and then preparing a plan for providing desktops based on the determination of requirements. The sequence in FIG. 4 is performed by the pool resource management engine 380 in FIG. 3. The pool requirements for the desktop pool 214 are first collected (410). The regional infrastructure among the available cloud regions such as the cloud regions 312-312(N) in FIG. 3 is then pre-created (412). The constraints from multiple cloud providers available in multiple regions are analyzed (414). An initial provisioning plan is derived based on the collected desktop pool requirements (416). The pool is then sized for optimal performance (418). The specific resources that provide the desktop may be adapted to run-time conditions (420), revising the provisioning plan. The sequence in FIG. 4 may be repeated as conditions change.

The initial step is to collect pool requirements such as demand schedule, desktop capabilities, costs, and response time (410). In order to guarantee required availability of the virtual desktops, at the required times, with required user experience, and within required cost and other parameters, the supply of appropriate desktop virtual machines (VMs) available in certain regions and other constraints of the cloud provider are considered.

FIG. 5 illustrates a typical set of requirement dimensions for one use case for creation of a desktop pool, and typical example values for those requirements. FIG. 5 shows a table 510 of an example set of requirement dimensions for example cloud regions for a desktop pool. The example dimensions in the table 510 include an anticipated demand schedule 512, a user location requirement 514, a set of desktop capability requirements 516, a cost constraint requirement 518, a response time requirement 520, and a carbon footprint requirement 522. In this example, the anticipated demand schedule 512 is the number of anticipated desktops during certain times and days. The user location requirement 514 is the physical location of the desktop user or a concentration of desktop users. The desktop capabilities requirement 516 may include processing capabilities (e.g., CPU type), storage capabilities (e.g., memory size, disk class, disk size), and operating system requirements. The desktop capabilities are thus those that are defined by the requirements of the users in the particular logical pool such as those who need access to a sales desktop. Such requirements for a sales desktop may differ from other types of desktops such as an engineering desktop. The cost constraint requirement 518 can be used by the system to differentiate between similar services that vary in underlying cost. For example, some cloud regions charge a higher price than others for the same resource and the cost constraint can be used as input in planning the prioritized order of cloud region selection. The response time requirement 520 includes the initial response time (affecting the experience of waiting to connect to a new session) and the subsequent response time (affecting the perception of user interaction lag) of the desktop system. The carbon rating 522 is a desired score in some rating system (such as estimated tons of CO2 emitted per year, described as a percentage of some target) that may be used to compare the relative environmental impact of virtual desktops hosted by different cloud regions.

A second table 550 shows an example set of collected requirement values for the table 510. In this example, the schedule requirement 512 includes 1000 desktops as a base line, 3,000 desktops between 8 AM and 11 AM from Monday to Friday, 2,800 desktops between 11 AM and 6 PM from Monday to Friday, and 500 desktops for Saturday and Sunday. The user location requirement 514 is Bangalore, India. The desktop capability requirement 516 is 4 cores, 16 GB memory, high performance disk class, 256 GB disk size, and Windows 11 operating system. The cost constraint requirement 518 is $100 for each of the example users. The response time requirement 520 includes the initial response time of 38 ms and the subsequent response time of 16 ms. The carbon rating is 38%.

In this example, a group of desktop users in the desktop pool is expected to normally generate a baseline demand for 1,000 desktops from the pool as shown in the table 550. However, a spike in demand for desktops is expected on weekday mornings and afternoons as shown in the schedule entry 512. In contrast, weekends have lower demand for the desktops. There is also a target cost and user experience expectation (initial connection lag, and interactive lag) for the desktops in the pool.

There can be other requirement dimensions particular to the goals of a desktop customer. This is exemplified in the carbon rating target to achieve environmental or public relations goals. This demonstrates the flexibility of the example process.

As part of preparing for dynamic provisioning, regional cloud infrastructure may need to be created, either automatically or as part of a manual pre-configuration step 412 in FIG. 4. The pre-creation may include infrastructure elements such as: virtual networks, storage devices, protocol gateways/brokers, and virtual desktop templates. These may be freshly allocated from a cloud provider, and may or may not have been previously reserved for use.

The process in FIG. 4 then analyzes constraints from multiple cloud providers in multiple regions (414) that may be considered in the desktop pool. To assist in applying these constraints, a pre-configured weighting factor may be applied. FIG. 6 shows an example of one implementation in which the process considers eight cloud provider region constraints as listed in a table 600. In this example, the constraints are listed in a column 610. In this example, the constraints include the provider, the region, the carbon rating, predicted status, the predicted capacity, the predicted initial latency, the subsequent latency, and the cost. Each of the constraints listed includes a separate set of consideration descriptions listed in a column 612. These are not used by the logical method itself but could be used in an administrative user interface to explain the constraints to administrative users. The table 600 includes a column of weighting factors 614 expressing the relative importance of each of the eight example constraints in the column 610. Not all possible constraints are indicated here, or mechanisms that could be used to assign weight to them; these are depicted here for illustrative purposes. In this example, each factor that is analyzed by the system carries a weighting that may be specified as part of system configuration options specified by administrators. Some factors may be derived from other configurations. For example, some applications require lower initial latency (because the pattern of use is expected to be frequent reconnection) while others require lower subsequent latency (because they are highly interactive). In another example, the weighting of the cost constraint could be inferred by budgetary considerations available from some other planning tool.

FIG. 7 shows a table 700 of an example simplified summary of key information about cloud provider region constraints that may be collected and analyzed in terms of predicted capacity, cost, or other information received from clouds. This information can be derived from a cloud provider API, configurations, or other sources of information. For example, regional carbon ratings may be published by cloud providers. The predicted capacity of the region may be available from the cloud provider API, and/or may be derived from historical data collected about availability during different time periods. Predicted latency may be derived by analyzing historical data collected by monitoring service. Cost may be obtained from cloud provider product catalog APIs or other published information. Provider/region information may ultimately be collected and maintained by system administrators when not available automatically.

The table 700 in FIG. 7 shows an example of 8 constraint raw values for 5 distinct cloud provider regions. The table 700 has a column 710 listing the cloud provider. A column 712 lists the region of each of the cloud providers. In this example, a column 714 lists the carbon rating of the region, a column 716 lists predicted status of the region, a column 718 lists the predicted capacity of the region, a column 720 lists the predicted initial latency of the region, a column 722 lists the predicted subsequent latency of the region, and a column 724 lists the predicted cost per hour of the region. The data in the columns 714, 716, 718, 720, 722, and 724 is derived from a cloud provider API, configurations, or other sources of information as described above. In order to meet anticipated demand schedules, the system can predict factors that will be used to create the plan, using heuristics, machine learning, or other analytical techniques. Taking the examples illustrated in table 700, the predicted cost/hr 724 indicates that the provider CloudPro in region 'Asia South' and 'NE Asia-1' have an advantage. Furthermore, the predicted capacity 718 and latency 720 and 722 all fall within the required parameters. Therefore these two regions will be placed at the top of the priority list. The weighting of factors 614 means that even though the carbon rating of CloudPro in 'US West' is higher, the weight of the carbon rating factor 614 itself is lower than that of cost and performance factors. Finally, the top region of the priority list is determined to be CloudPro/Asia South because the Carbon Rating is higher than CloudPro/NE Asia-1 and all other factors are equal.

After the constraints are analyzed, the provisioning plan is derived from the analysis (416). The engine 380 in FIG. 3 will continually (or periodically) evaluate cloud provider region constraints such as those in FIG. 7 against requirements such as those in FIG. 5. The engine uses this analysis to create and/or update a provisioning model and resource plan possibly spanning cloud providers, and cloud provider regions.

As noted above, the various attributes of the constraints can be evaluated using a configurable weighting scheme, and configurable logical rules such as maximum and minimum threshold values. This allows system managers to prioritize different constraints. For example, a system manager may decide whether user experience is more or less important than cost and adjust the resulting provisioning model and resource plan accordingly. A simple formula to describe this logic might be to take a raw score for each region; multiply by a weighting factor to determine weighted scores; and sort the region list based on the weighted scores. Such a method might result in a prioritized list of regions, and the required desktops are allocated in such a way as to not exceed predicted capacity of any region. It may be that the method attempts to allocate batches of desktops in some unit size, such as a multiple of 500 desktops.

FIG. 8 shows an example provisioning plan created based on the comparison of the requirements in FIG. 5 with the constraints in FIG. 7. For example, the engine may create a plan that on Monday morning at 8 AM Pacific time, 2,000 cloud desktops with a pre-installed call center application suite will need to be available for call center workers located in India with a required low latency and optimizing for certain costs. Thus, a table 800 in FIG. 8 shows the optimal allocation of desktops among different cloud regions in accordance with the requirements and collected constraints.

The table 800 includes the regions available listed by a time in the plan in a column 810, the provider in a column 812, the region of the provider in a column 814, and the demand allocated in a column 816. In this example, based on the analysis of the constraints relative to the requirement, there are 1000 desktops allocated to a first region of the first provider, 500 desktops allocated to a second region of the first provider, and 500 desktops allocated to a first region of a second provider. There are no desktops allocated to a third provider. As described above, these three regions best meet the most heavily weighted constraints of capacity, latency, and cost. There are no desktops allocated to a fourth or fifth region, third provider because the requirement of 2,000 desktops has already been met using the first three regions that achieved higher weighted scores. Thus, the VirtualNet/Central India region is not used in this plan because of its relatively high cost in column 724 of the table 700 in FIG. 7, and CloudPro/US West is not used in this plan because of both high relative cost in column 724 and poor relative initial latency in column 720. Because of the relatively high predicted capacity in column 718 of CloudPro/US West, it will correspondingly become a reserve that is not often used but ensures that all desktop requirements may be met as a last resort.

The pool resource management engine 380 in FIG. 3 will continuously (or periodically) manage virtual machines and cloud infrastructure components to reflect the current provisioning model. Using the example cited above, if at 8:45 am Pacific time, there are only 1,000 suitably managed cloud desktops, the pool resource management engine 380 executes a provisioning plan to expand the logical pool to the 1,000 additional cloud desktops needed.

In order to execute the plan, the pool resource management engine 380 automatically executes a strategy to provision different numbers of cloud desktops from different cloud provider regions according to a prioritized list of weighted constraint factors maintained by the pool resource management engine 380. For example, the preferred cloud provider regions may normally all be in Asia, in order to minimize latency as shown in the table 800. However, if one cloud provider region only has 1,000 desktops available, the plan may call for provisioning those 1,000 desktops, then provisioning the remaining 1,000 desktops using a different public cloud provider. If there is no single cloud provider region that can satisfy this request, the pool resource management engine 380 will allocate cloud desktops from multiple cloud provider regions until the request if fulfilled, according to the provisioning plan.

The pool resource management engine 380 may also use the strategy of distributing allocation of desktops across cloud provider regions to minimize the risk of failure of any one cloud provider region. In the example in FIG. 8, this is represented as allocating 500 desktops from the NE-Asia region and 500 desktops from the Central India region, as the regions have similar constraints, and the risk can be spread between them.

Because failures can also occur at the scope of the entire cloud provider, the pool resource management engine 380 can also use the strategy of distributing the allocation across cloud providers. If provisioning attempts fail for the initial set of cloud providers, the plan can be dynamically adjusted to continue filling the request using less optimal cloud provider regions.

FIG. 9 shows a table 900 illustrating adjustments to the plan in FIG. 8 where certain cloud provider regions fail. Each row 910, 912, 914, and 916 show the cloud providers in the plan in FIG. 8. In this example, cloud providers in rows 910, 912, and 914 have failed and thus cannot provide desktops. All the Asia cloud provider regions in rows 910-916 failed, but the critical requirements of the pool are still met by falling back to the North American cloud provider region in row 914. Thus, all 2,000 desktops are now supported by the North American cloud provider region in row 914. This may have some level of degraded user experience, higher cost, or some other sub-optimal results as the cloud provider region was originally not in the plan because it was not optimal for the requirements and the constraints.

As explained above, the result of the implementation of the desktop pool provisioning plan is that the logical pool has the right size for the planned requirement. In this example, the current number of virtual desktops was 1,000 before Monday morning, and the execution of the plan raises the number to the required count of 2,000.

The provisioning plans are created in advance with information available in advance. As runtime data is collected by the system, the plans are adjusted automatically. For example, if the population of registered users increases, the plan may be adjusted to include a larger logical pool of virtual desktops to accommodate them. Also, as already noted, provisioning failures will feed back into the engine to revise plans. In effect, the ordered list of cloud provider regions also serves as the preferred order to attempt failover.

Furthermore, excess virtual desktops are deallocated. Unused virtual desktops may occur because of stale data in the plan, a sudden shift in demand, or the normal end of a workday. In this case, the provisioning plan would call for the deallocation of unused virtual desktops. This activity could also take into account that only unused desktops are deallocated. This is why the right-sizing phase always takes into account existing virtual desktops and does not rely on earlier versions of the provisioning plan.

Without use of the example pool resource management engine, an operator would have to incur the overhead of the maximum number of pre-reserved desktops to insure availability, even though the typical requirement is for many fewer desktops. Thus, the example engine addresses the previous need to over-provision the number of desktops in order to guarantee availability.

Thus, the example pool resource management engine allows a customer to get the benefits of a dynamic pool that is not limited by the constraints on a particular cloud provider or regional data center's capacity. The operator will only incur costs of the number of cloud desktops currently needed, with less risk of failure to provide the required number of cloud desktops when needed, because the only limiting factors are availability on all cloud providers in all regions. The example process allows for meeting critical availability requirements with degraded user experience or higher cost, rather than failing to provide critical availability.

Furthermore, because the pool resource management engine operates independently based on logical configurations, it requires less interaction from human operators to implement multi-cloud provisioning strategies.

FIG. 10 is a flow diagram of the routine to formulate a plan for allocation of cloud region and manage a logical desktop pool. In this example, the machine readable instructions comprise an algorithm for execution by: (a) a processor, (b) a controller, and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIG. 10, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The routine first receives a set of requirements for virtual desktops in a desktop pool (1000). The routine then determines the available cloud regions that meet the requirements for providing the desktops of the desktop pool (1002). The routine then collects information from the available cloud regions and determines the constraints for each of the available cloud regions (1004). The routine then applies weighting to the constraints for each of the available cloud regions (1006). The routine then determines a plan for allocation of the desktops of the desktop pools based on the requirements and weighted constraints (1008). The routine then makes assignments for each of the available cloud regions as indicated in the plan (1010).

During operation of the desktops in the desktop pools, the routine periodically determines whether relevant conditions such as latency, availability of a cloud region, or change of location of users (1012). If no conditions have changed, the routine continues allocation of the desktops to the available cloud regions according to the plan and continues to monitor for changes in conditions (1012). If a condition has changed, the routine modifies the plan according to the changed condition (1014). The routine then implements the modified plan for providing the desktops in the desktop pool (1016). Once the modified plan is implemented, the routine returns to monitoring system operation.

The above described flexible virtual desktop system addresses the need for providing reliable multi-cloud desktops in an optimal fashion as defined by requirements, such as user experience and cost. Operators of virtual desktop systems lose productivity when users cannot access their primary virtual desktop because of issues out of their control. By providing availability of multiple desktop resources, the system addresses the desktop availability caused by cross cloud/cross regional issues. The system automatically provides the optimal choice of cloud and region to avoid unnecessary costs or lack of availability of virtual resources, based on changing conditions.

The multiple available desktop resources provided by the flexible virtual desktop system insures a user is always guaranteed access to a desktop anytime and from any location in an optimal fashion as defined by desired requirements. A user connecting to a desktop via a client device is completely seamless, is optimized for user experience, and happens without the knowledge of the user.

As an alternative to the process in FIG. 4, another technique to optimize available desktop resources is to produce a prioritized list of specific regions out of a set of possible regions to be used to provision a cloud desktop for a particular user. This process may be performed whenever a cloud desktop is requested, allowing the cloud desktop to be provisioned in the highest priority region. The general process of provision of a cloud desktop based on a prioritized list of cloud regions is shown in FIG. 11. First, a cloud usage profile for the user is produced (1110). Region information is collected and analyzed (1112). A prioritized list of regions is created for the user (1114). The user may then require a cloud desktop (1116). The routine then recommends the highest priority healthy region for providing the desktop to the user (1118). The routine then provisions the cloud desktop in the recommended region (1120).

The creation of a cloud usage profile 1110 is based on collecting cloud desktop user data. When a user connects to a cloud desktop, there is various operational data collected about usage, including the location of the user, the time and duration of each connection, the applications used, the performance of the remote desktop protocol used, CPU and memory utilization on the cloud desktop itself, the quality of the network used, and other factors. Such operational data may be collected from the client device, the desktop agent, the gateway through the gateway agent, or other components of the control plane 150. FIG. 12A shows an example table 1200 of 1,500 users and three example facts collected about each user. In this example, the facts are typical location, application package, and network quality.

These same attributes may be used while examining usage from a large number of other users, including other users of the same or possibly different customers of the cloud desktop service, along with configuration input from administrators, to derive profiles of usage.

A profile represents one stereotyped typical usage scenario that will be used to recommend a particular region in which to provision a cloud desktop. The number of profiles discovered and the level of specificity to individual users may be selected depending on different needs. For example, profiles could be very fine-grained and might match the latency expectations at or near the individual region level. Alternatively, profiles could be kept very large grained and cover large geographical areas, resulting in fewer profile configurations to manage. Also, profiles may be very specific as to application use cases, or cover broad application categories, or not be related to applications at all.

FIG. 12B shows a table 1220 that depicts one example implementation in which the frequent combinations of application package, network quality, and broad geographical area may be used to derive seven profiles. In this example, the seven profiles include Designer US remote, Designer India remote, Call Center US remote, Call Center US office, Call Center India Remote, Call Center India Office, and Office Admin US office.

In one alternative, the profile may be unique to the combination of the attributes found in the usage data. One example is a set of attributes including primary application, network quality, and location of the user. The primary application used implies a role of the user. In the example data, the application 'Super CAD' or 'Revit' implies a designer. The application 'Call Mgr' or 'CRM-2000' implies a 'Call Center' worker. The application 'Prod Suite' implies an 'Office Admin'. This kind of mapping may also include configurations, a rule engine, machine learning technique, or otherwise be particular to the implementation of the invention and the business domain. Because this mapping may go across customers or customer organizations, this technique may be used to analyze the needs of brand new users as well as existing users.

The network quality implies whether the user is 'Remote' or 'Office.' The location of the user may be mapped to a larger geographical context. For example, locations in India imply a geographical context of 'India'. Locations in the United States imply a geographical context of 'US'. The system can use the unique combinations of these attributes to derive a set of profiles. In the example data the system discovers seven distinct profiles, based on the information in the table 1200 in FIG. 12B. Using this information, the system may easily associate each user with a profile based on the collected user information.

It is possible that a user may use multiple cloud desktops possibly from different networks or from different locations. Thus a user could be associated with multiple profiles. In that case, a request for a desktop would be associated with a particular context and therefore be associated with a single profile. For clarity, in this disclosure the examples are limited to the simpler case in which a user requires a single cloud desktop. In FIG. 12C is a table 1240 that shows the example association of each user with one of the seven profiles.

Returning to FIG. 11, after producing the cloud usage profile, collection and analysis of region information 1112 is performed. The process requires information about each available region and thus the collection and analysis of cloud regions is performed. FIG. 12D shows a table 1260 that illustrates some attributes about regions in the examples described above that will be useful in prioritizing them and that may be gathered by the system in various ways that can include but are not limited to application programming interfaces (APIs) of cloud providers. Thus, the table 1260 lists Cloud Pro Asia South and NE Asia regions and VirtualNet Central India and US Central regions. Additional information that may be collected could include predicted latency between various locations and each region.

After collection and analysis of the region information in FIG. 11 a prioritized list of recommended regions for each user is created 1114. The prioritized list is created by analyzing each region with regard to the suitability for each profile, or all profiles, and quantitatively comparing them. This can be done many ways. For example, the system could use static configurations specified by administrators, statistical methods of ranking the regions to optimize for specific profiles, rule-based systems, machine learning techniques, or some combination of these. The example weighting of region factors may be seen in the table 600 in FIG. 6. In this example, each factor that is analyzed by the system carries a weighting that may be specified as part of system configuration options specified by administrators. The weighting may be used as part of a statistical method to derive a score for each region.

After determining weighting of factors, a prioritized list of regions may be generated for each user in order to minimize latency and optimize user experience. The prioritized list may also optimize for other region weighted attributes such as capacity, predicted status, cost, initial latency from a particular location, subsequent latency from a particular location, carbon rating, or any other regional attributes. FIG. 13A shows an example table 1300 that lists user profile bases and regional recommendations for each of the four example regions for the individual region for the user profile. A prioritized list may thus be generated for each user from the priority of the user profile. FIG. 13B shows an example table 1320 of user priority assignments of each of the regions.

After the prioritized list is generated, the process waits until a user requests a cloud desktop. As explained above, the user request is where a client device signals the desire to launch the desktop, or some similar means. In order to fulfill the request, the system must select a region dynamically in the process in FIG. 11. Thus once a user request is received, the system recommends the highest priority healthy region for provision of the desktop (1118) in FIG. 11.

For example, a single region is selected from the prioritized list of regions by choosing the highest priority region for the user that meets certain runtime criteria, that may be specified in some way. One such runtime criteria is health. Thus, health criteria for a region may include, but are not limited to, a measure of network health (such as cloud provider uptime), resource availability, dynamic pricing of resources, or other factors that may be highly dynamic in nature.

Figure 14:
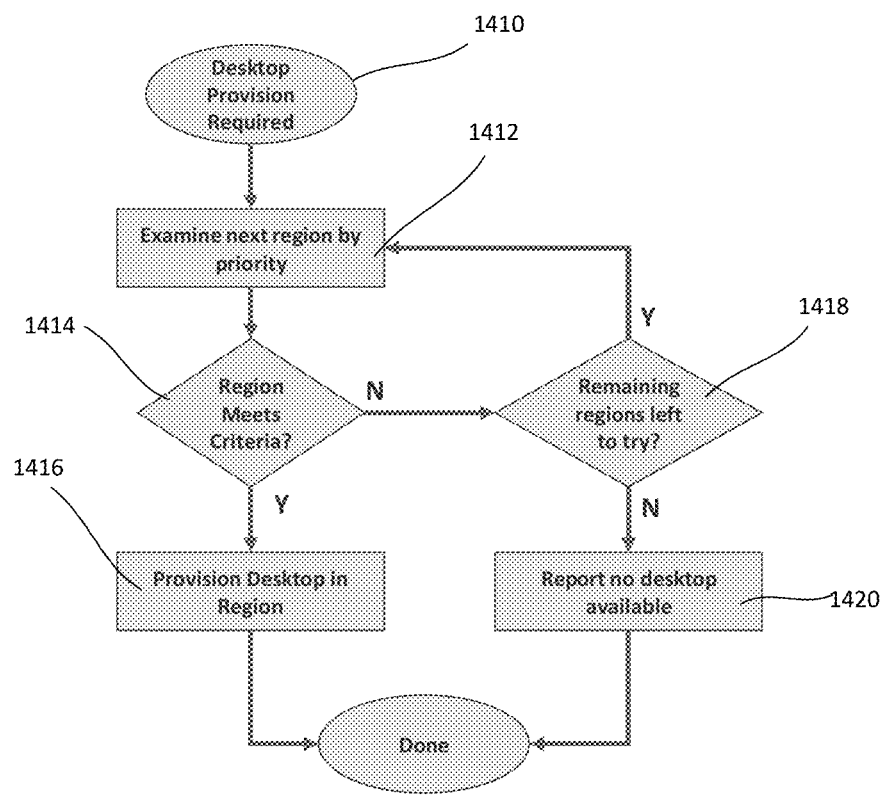
FIG. 14 is a flow diagram of an example test process for criteria for successful assignment of cloud regions.

FIG. 14 is a flow diagram of an example test process that may be performed against the criteria for success before provisioning is attempted in a particular region. Thus, a request for a desktop is received (1410). The process examines the highest priority remaining region for the user (1412). The process determines whether the selected region meets the runtime criteria (1414). If the region meets the runtime criteria, the desktop is provisioned from the region (1416) and the routine ends. If the selected region does not meet the runtime criteria (1414), the routine determines if there are remaining regions left to try (1418). If there are remaining regions, the routine examines the next highest priority remaining region (1412). If there are no remaining regions, the routine creates a report to users and/or administrators that no desktop is available (1420).

If it is not possible to assess the region against the criteria without attempting to provision a desktop, the flow would change slightly to perform a provisioning attempt, and if it fails, recover by trying the next region by priority until provisioning is successful. Alternatively, analytical techniques may be used to select the best region based on run-time conditions. Such analytical techniques may include rule-based systems, machine learning, or other statistical methods.

Using the example data provided above in table 1320 in FIG. 13B, users U1, U2, and others would be assigned to region 'CloudPro/US West' whereas user U3 and others would be assigned to region 'VirtualNet/US Central' based on the priority listed and the testing of runtime criteria performed by the process in FIG. 14. Once the testing for runtime criteria is completed and a region is selected for a user, the cloud desktop is provided in the recommended region. As explained above, the cloud desktop service interacts with the cloud provider to provision the appropriate cloud desktop in the recommended region. This may be done at the time the user attempts first connection to the desktop, or could be done in advance of a connection request.

The analytical portion of the steps of the routine in FIG. 14 or the prioritization may always be re-triggered based on run-time changes. For example, the recommendations may be periodically re-evaluated based on current information and updated accordingly.

Another process is warming up desktops in different Cloud regions. This may be done in response to a prediction of demand as in FIG. 4 or in response to the prioritized use list generated in the process in FIG. 11. Individual users may experience some delay in accessing the desktop when their cloud desktop is provisioned on-demand, because the cloud desktop may need to be freshly created and this takes some time. To mitigate this, a technique is to "warm-up" the cloud desktop by provisioning it before it is required. For example, a request may be sent to the cloud provider using a cloud API to provision a certain type of cloud desktop from a particular cloud desktop template. Alternatively, if a cloud desktop was already created that meets the criteria, but was placed in a hibernated or "paused" state to reduce resource costs, it can now be transitioned to an active state using a cloud API. Once "warm-up" is complete, the desktop is available for assignment and connection by end users with minimal delay that can impact user experience.

Because this system has access to historical usage data as well as other configuration data, it may aggregate the region recommendations produced by the process in FIG. 11 described above in order to determine when and where to warm-up quantities of cloud desktops in various regions. Alternatively, the system may use the predictions from the process in FIG. 4.

Figure 15:
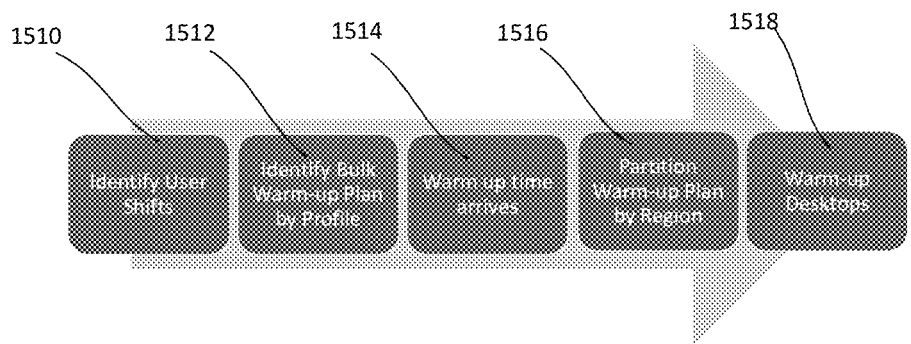
FIG. 15 shows an example process of warming up desktops in the selected cloud regions.

FIG. 15 shows the process of warming up desktops. First the process identifies user shifts (1510). The process then identifies a bulk warm up plan by user profile (1512). The process determines when the warm up time arrives (1514). The process then partitions the warm-up plan by region (1516). The process then initiates the warm-up of the specific desktops (1518).

In relation to identifying user shifts, configuration data may already indicate the planned shifts of work by a particular user. Furthermore, historical connection data may be analyzed to derive an actual predicted start time of a particular user. FIG. 16A shows a table 1600 of predictions for users based on analysis of collected operational data. For example, the connection start events for several users may tend to cluster around certain date and times that correlate to known patterns of work and thus may indicate the beginning of a shift of work. As illustrated in table 1600, user U1 appears to be assigned to a weekday morning shift, normally considered to start at 8 am and end at 4 pm. Additionally, historical connection data may discover that the actual average start time of user U1 tends to be 7:46 am, and there may be a certain standard deviation from this. Also, the profile, which is already based on a geographical context, has been identified for each user using the method described above.

Based on user ideal warm-up times, the system may aggregate these for each user profile (1512) in FIG. 15. Data also taken into account could include the deviation from the average that is observed, the length of time required for a newly-provisioned desktop to become ready for the end user, and possibly other factors such as administrator preferences that may be based on user profile. The result is a computation of desired bulk warm-up times for each user profile. In the simplest case, there is one bulk warm-up time planned for each user profile, but there also could be multiple warm-up activities planned for a single user profile.

FIG. 16B shows a table 1620 that is an example of an assignment of a bulk warm-up time for each profile. In this example, the assignment of a bulk warm-up time is a case covering all 1,500 desktop users described in the example data. The warm-up time is specified to be in a certain timezone (or could be expressed in UTC)—possibly based on a mapping between each profile and a timezone. At this point, the system is ready to take some action when the warm-up times arrive, even though it still does not know exactly which regions will be used.

When the next warm-up time event arrives (1514), the system begins to provision cloud desktops. In this example, as shown in table 1620, 90 desktops on the next weekday at 7:45 am PST is the next warm-up time event for the listed profiles. However, the routine still needs to resolve this activity between the various possible regions, because provisioning requires a specific region to succeed.

An example of resolving regions may involve the information shown in a table 1640 in FIG. 16C. In this example, the system considers the users belonging to the profile that is the subject of the warm-up activity, along with the prioritized region list already produced as part of the logic described earlier. In the table 1640, 2 of the users, U1 and U8, are associated with the CloudPro/US West cloud region as the first choice, user U6 has been determined to use the VirtualNet/US Central cloud region as the first choice. This may be because of reduced latency between the location of user U6 and the region located in the UC Central cloud region.

The system has enough information to partition the 90 cloud desktops into a number of regions. For example, the system knows the user profiles for each desktop including the location of the user and the prioritized list of regions for each user. The same methods described above for the on-demand provisioning case apply here to discover the region recommendation for each user. One example of the logic for the profile as a whole can be illustrated in the flow diagram in FIG. 17. The routine begins with a warm-up time for a user profile (1710). The routine determines whether there are more users that are defined by the profile (1712). If there are further users, the routine examines the prioritized region list of the next user (1714). The routine obtains a region recommendation based on the list of the user (1716). The routine then increases the count for the region (1718). The routine then loops back to determine whether there are more users that are defined by the profile (1714). When there are no longer any users that are defined by the profile, the routine then warms up the desktops in each relevant region (1720).

Table 1640 only shows 3 users, but for purposes of illustration the same proportion holds for the full sample of data of 90 users (not shown here for conciseness). Therefore, the proportion is 2 users that would optimally connect to 'CloudPro/US West' for every 1 user who would optimally connect to 'VirtualNet/US Central'. In an actual implementation, each users' priority list of regions would be considered and aggregated to get the total count of desktops for the region involved. Accordingly, out of the total community of 90 users with the profile 'Designer—US (Remote), they would be partitioned between regions as illustrated in in the table 1660 in FIG. 16D.

As shown in FIG. 15, the process may warm-up desktops (1518) as the system now has all the information needed to execute provisioning in advance for multiple profiles at various times, creating cloud desktops in multiple regions that span cloud providers. Execution of the warm-up activity may include using a Cloud API to provision new desktops or restoring "paused" or hibernated cloud desktops to the active state.

The analytical portion of the steps in FIG. 15 may always be re-triggered based on run-time changes. For example, the plan may be periodically re-evaluated based on current information and updated accordingly.

The provisioning plans are created in advance with information available in advance. As runtime data is collected by the system, the plans are adjusted automatically. For example, if the population of registered users increases, the plan must be adjusted to accommodate them.

Another feature is to dynamically provide access to a cloud desktop for users. Using the process for warming up desktops, the cloud desktop service may provision a desktop in one of several possibly multiple regions. At some subsequent time, once the user has attempted to access a cloud desktop, conditions may change. For example, new users matching a certain profile may have been added to the system that were not previously accounted for, and the recommended region does not have a sufficient quantity of warmed-up desktops. Other dynamic factors could include a given cloud region no longer meeting criteria for network health to utilize warmed-up desktops, or capacity to provision new desktops.

To meet these kinds of scenarios, a similar dynamic logic can apply to utilize the example method of dynamic region selection described above. The method to analyze usage and region attributes to create a prioritized list of regions for each user and warm-up desktops may be used.

One new attribute that may come into play is a configuration, rule, or derived conclusion that the latency while connected to a region takes precedence over a delay in provisioning a fresh desktop in a region on demand. These can be illustrated as a configuration choice as follows. Thus, a latency-first policy optimizes the responsiveness and user experience during a connected session with a cloud desktop. If latency-first policy is not in effect, another policy such as a response-first policy optimizes a different aspect of the user experience by minimizing delay of completing the initial connection to the desktop. Such a response-first policy may thus provide a warmed-up desktop in the next available cloud region from the priority list. If a warmed-up desktop is not available, a different policy giving another priority such as availability may be initiated to provide a desktop at less than optimal circumstances.

Figure 18:
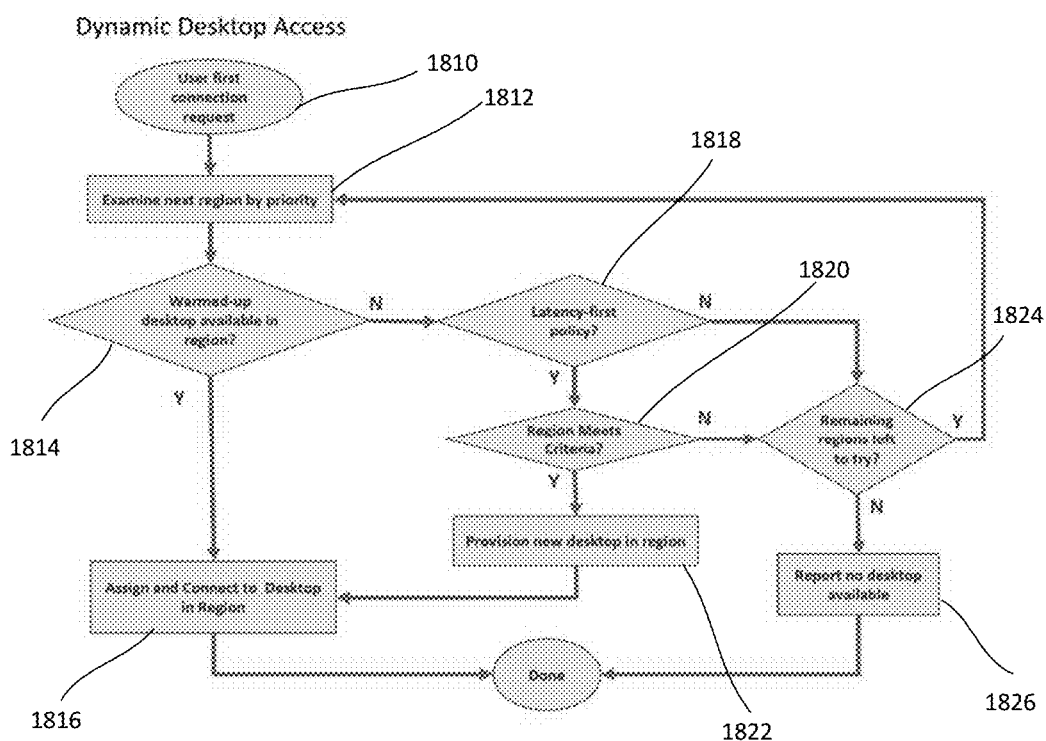
FIG. 18 is a flow diagram of an example routine that optimizes the responsiveness and user based on an example policy.

One example of logic that considers a latency-first policy is illustrated in the flow diagram in FIG. 18. A request is received for a desktop from a user (1810). Once a user has requested a desktop, the prioritized list of regions for the user is retrieved or generated, possibly using current available data. The top priority region on the list is examined (1812). The routine determines whether a warmed up desktop is available from the top priority region (1814). If there is a warmed-up desktop available, it is assigned to the user and the user connects to it (1816). The warmed-up desktop may have been provisioned based on the needs of a user with the same usage profile, not necessarily the user requesting it now.

If there is no warmed-up desktop available in the region under consideration (1814), the routine determines whether a latency first policy is in effect (1818). If a latency-first policy in effect, then the routine checks whether the cloud region meets the criteria described earlier for provisioning a new desktop (1820). If the cloud region meets the criteria, the desktop is provisioned in the highest priority region (1822). The user is assigned to the region, and the user is connected to the region (1816). While there is some factor of delay in the initial experience, the selected region is optimal in providing a low-latency experience. If a latency-first policy is not in effect (1818), the routine the routine determines whether are any remaining regions (1824). If there are remaining regions, then the next region in the list is examined (1814). If the region does not meet the criteria (1824), the routine then determines whether there are more available regions (1824). If all the regions have been examined (1824), the routine reports that no desktops are available (1826). One method of handling this situation is to re-enable the latency-first policy and begin the process again. This will result in a new desktop provisioned in the optimal region (1822), which may be preferable to a failure to provision a desktop for the user.

The following three scenarios illustrate this complete flow using example data described earlier. For each of these example scenarios the preferred order of priority for regions, as produced by the system described above, is as shown in the first entry in the table 1640 in FIG. 16C. Thus, the user U1 is classified as a designer (US) remote and the Cloud Pro US West region is first priority, the Virtual Net US Central region is second priority, the Virtual Net Central India region is third priority and the CloudPro Asia-South region is fourth priority.

Figure 19A:
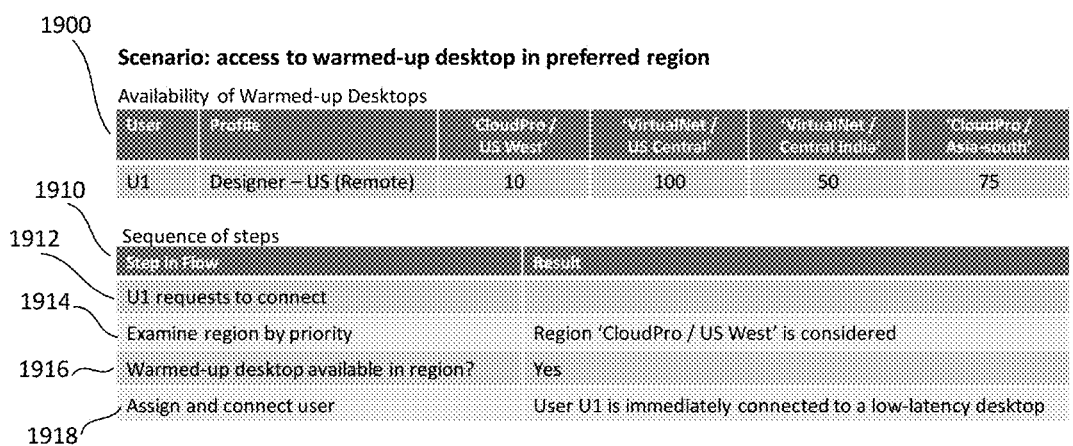
FIG. 19A are tables that show the process when a warmed up desktop is available.

In one scenario, there are warmed-up desktops available in the preferred region. This is the optimal scenario and should be the normal one produced by the methods described earlier. The steps followed by the flow described above are illustrated in a table 1900 and a table 1910 in FIG. 19A. As shown in the table 1900, there are 10 warmed up desktops in the Cloud Pro US West, 100 warmed up desktops in the Virtual Net US Central region, 50 warmed up desktops in the Virtual Net Central India region, and 75 warmed up desktops in the CloudPro Asia-South region. A second table 1910 shows the steps in the process performed by the routine in the first scenario. A user first requests to connect via a client device to the system (1912). The regions are then examined by priority (1914). In this example, the Cloud Pro US West region is considered. The routine then determines whether there are warmed up desktops available in the selected region (1916). Since there are 10 warmed up desktops, the routine assigns the Cloud Pro US West region and connects the client device of the user (1918).

Another scenario is that there may not be a warmed-up desktop available at the moment of the request as shown in tables 1920 and 1930 in FIG. 19B. As shown in the table 1920, there are no warmed up desktops in the Cloud Pro US West, 100 warmed up desktops in the Virtual Net US Central region, 50 warmed up desktops in the Virtual Net Central India region, and 75 warmed up desktops in the CloudPro Asia-South region. When using a latency-first policy, the flow can be described in the table 1930. A user first requests to connect to the desktop system (1932). The regions are then examined by priority (1934). In this example, the Virtual Net Central region is considered. The routine then determines whether there are no warmed up desktops available in the selected region (1936). The routine determines that there is a latency policy in effect (1938). Since there is a latency-first policy in effect, the routine examines whether the region meets the policy (1940). In this example, the Cloud Pro US West region meets the policy. The routine then provisions a desktop in the Cloud Pro US West (1942). The user experiences some delay while the desktop is provisioned. Once the desktop is provisioned in the Cloud Pro US West region, the routine assigns the region and connects the user (1944). The assigned desktop is a low latency desktop.

While not depicted in the table 1930, if no desktop can be made available with a latency-first policy, as described previously, then there can be an option to repeat the entire flow with latency-first not in effect, to guarantee that the user can have some kind of desktop even though there may be a degradation of user experience.

A final scenario is shown in tables 1950 and 1960 in FIG. 19C, where no latency policy is applied. As shown in the table 1950, there are no warmed up desktops in the Cloud Pro US West, 100 warmed up desktops in the Virtual Net US Central region, 50 warmed up desktops in the Virtual Net Central India region, and 75 warmed up desktops in the CloudPro Asia-South region. When no latency-first policy is applied, the flow can be described in the table 1960. A user first requests to connect via a client device (1962). The regions are then examined by priority (1964). In this example, the Virtual Net Central region is considered. The routine then determines whether there are no warmed up desktops available in the selected region (1966). The routine determines that no latency-first policy is in effect (1968). If there is not a latency-first policy in effect, the routine examines the next priority region (1970). In this example, the next priority region is the Virtual Net US Central region. The routine then determines whether a warmed up desktop is available in the region. Since there are available warmed up desktops in the Virtual Net US Central region, the routine assigns the region and immediately connects the client device of the user even though it is not the lowest latency region for the user (1972).

As stated above, these flows are simply illustrations of one possible embodiment of the invention. The specific logical steps can vary in their details. The essence of the invention is that user data may be analyzed to produce an order of preference for regional selection that can be utilized in all phases of dynamic provisioning, including the assignment and connection to a cloud desktop on-demand.

Without this invention, to ensure availability, a customer would have to incur the overhead of the maximum number of pre-reserved desktops even though the typical requirement is for many fewer, effectively over-provisioning in order to guarantee availability.

The above described system allows a customer to get the benefits of dynamic provisioning of cloud desktops that is not limited by the constraints on a particular cloud provider or region capacity. The customer will only incur costs of the number of cloud desktops currently needed, with less risk of failure to provide the required number of cloud desktops when needed, because the only limiting factors are availability on all cloud providers in multiple, perhaps many, regions.

Furthermore, user experience is enhanced in a cost-effective way because cloud desktops may be warmed-up intelligently based on user behavior and administrator preferences. The principles described herein allow for meeting critical availability requirements with degraded user experience or higher cost, rather than failing to provide critical availability.

Furthermore, because the engine operates independently based on logical configurations, it requires less interaction from human operators to implement multi-cloud provisioning strategies.

Figure 20:
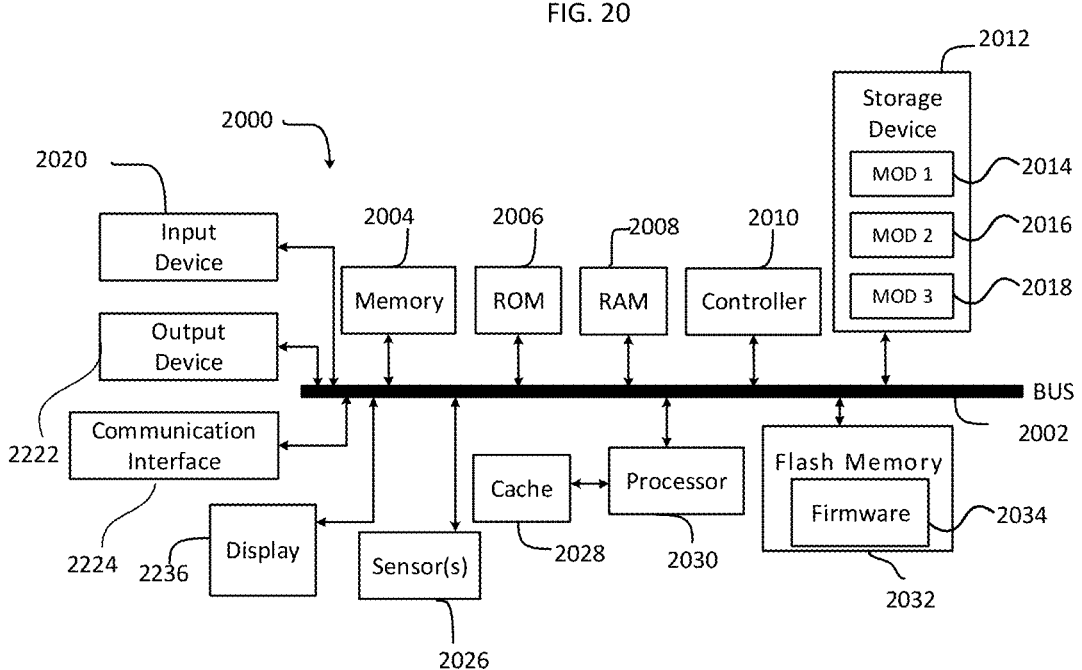
FIGS. 20 and 21 illustrate exemplary systems in accordance with various examples of the present disclosure.
Figure 21:
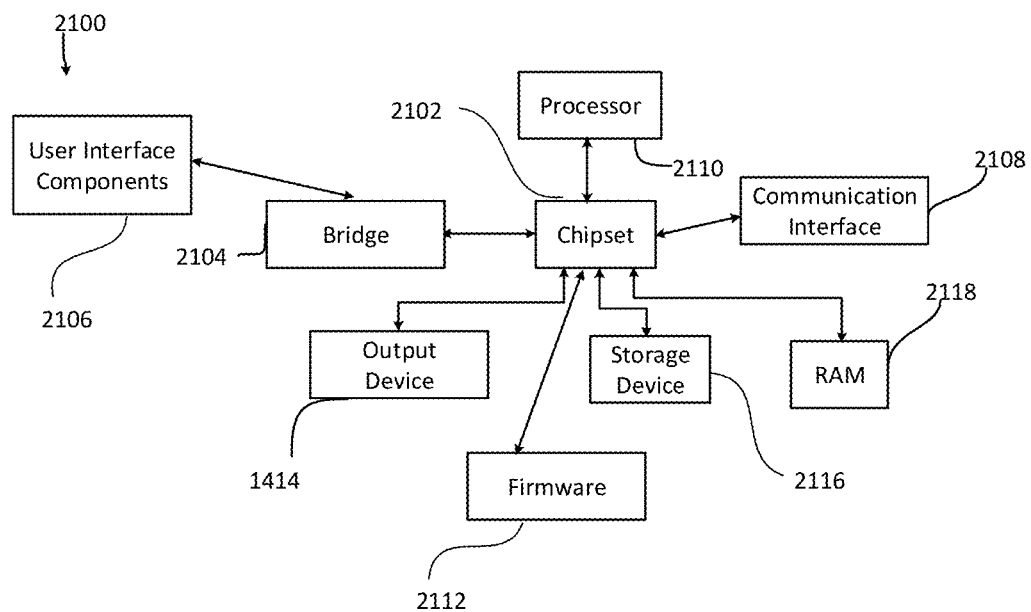

FIGS. 20-21 illustrate an example computing system 2000, in which the components of the computing system are in electrical communication with each other using a bus 2002. The system 2000 includes a processing unit (CPU or processor) 2030 and a system bus 2002 that couple various system components, including the system memory 2004 (e.g., read only memory (ROM) 2006 and random access memory (RAM) 2008), to the processor 2030. The system 2000 can include a cache of high-speed memory connected directly with, in close proximity to, or integrated as part of the processor 2030. The system 2000 can copy data from the memory 2004 and/or the storage device 2012 to the cache 2028 for quick access by the processor 2030. In this way, the cache can provide a performance boost for processor 2030 while waiting for data. These and other modules can control or be configured to control the processor 2030 to perform various actions. Other system memory 2004 may be available for use as well. The memory 2004 can include multiple different types of memory with different performance characteristics. The processor 2030 can include any general purpose processor and a hardware module or software module, such as module 1 2014, module 2 2016, and module 3 2018 embedded in storage device 2012. The hardware module or software module is configured to control the processor 2030, as well as a special-purpose processor where software instructions are incorporated into the actual processor design. The processor 2030 may essentially be a completely self-contained computing system that contains multiple cores or processors, a bus, memory controller, cache, etc. A multi-core processor may be symmetric or asymmetric.

To enable user interaction with the computing device 2000, an input device 2020 is provided as an input mechanism. The input device 2020 can comprise a microphone for speech, a touch-sensitive screen for gesture or graphical input, keyboard, mouse, motion input, and so forth. In some instances, multimodal systems can enable a user to provide multiple types of input to communicate with the system 2000. In this example, an output device 2022 is also provided. The communications interface 2024 can govern and manage the user input and system output.

Storage device 2012 can be a non-volatile memory to store data that is accessible by a computer. The storage device 2012 can be magnetic cassettes, flash memory cards, solid state memory devices, digital versatile disks, cartridges, random access memories (RAMs) 2008, read only memory (ROM) 2006, and hybrids thereof.

The controller 2010 can be a specialized microcontroller or processor on the system 2000, such as a BMC (baseboard management controller). In some cases, the controller 2010 can be part of an Intelligent Platform Management Interface (IPMI). Moreover, in some cases, the controller 2010 can be embedded on a motherboard or main circuit board of the system 2000. The controller 2010 can manage the interface between system management software and platform hardware. The controller 2010 can also communicate with various system devices and components (internal and/or external), such as controllers or peripheral components, as further described below.

The controller 2010 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 2010 to initiate or conduct specific hardware recovery procedures or operations, as further described below.

The controller 2010 can also include a system event log controller and/or storage for managing and maintaining events, alerts, and notifications received by the controller 2010. For example, the controller 2010 or a system event log controller can receive alerts or notifications from one or more devices and components, and maintain the alerts or notifications in a system event log storage component.

Flash memory 2032 can be an electronic non-volatile computer storage medium or chip that can be used by the system 2000 for storage and/or data transfer. The flash memory 2032 can be electrically erased and/or reprogrammed. Flash memory 2032 can include EPROM (erasable programmable read-only memory), EEPROM (electrically erasable programmable read-only memory), ROM, NVRAM, or CMOS (complementary metal-oxide semiconductor), for example. The flash memory 2032 can store the firmware 2034 executed by the system 2000 when the system 2000 is first powered on, along with a set of configurations specified for the firmware 2034. The flash memory 1332 can also store configurations used by the firmware 2034.

The firmware 2034 can include a Basic Input/Output System or equivalents, such as an EFI (Extensible Firmware Interface) or UEFI (Unified Extensible Firmware Interface). The firmware 2034 can be loaded and executed as a sequence program each time the system 2000 is started. The firmware 2034 can recognize, initialize, and test hardware present in the system 2000 based on the set of configurations. The firmware 2034 can perform a self-test, such as a POST (Power-On-Self-Test), on the system 2000. This self-test can test the functionality of various hardware components such as hard disk drives, optical reading devices, cooling devices, memory modules, expansion cards, and the like. The firmware 2034 can address and allocate an area in the memory 2004, ROM 2006, RAM 2008, and/or storage device 2012, to store an operating system (OS). The firmware 2034 can load a boot loader and/or OS, and give control of the system 2000 to the OS.

The firmware 2034 of the system 2000 can include a firmware configuration that defines how the firmware 2034 controls various hardware components in the system 2000. The firmware configuration can determine the order in which the various hardware components in the system 2000 are started. The firmware 2034 can provide an interface, such as an UEFI, that allows a variety of different parameters to be set, which can be different from parameters in a firmware default configuration. For example, a user (e.g., an administrator) can use the firmware 2034 to specify clock and bus speeds, define what peripherals are attached to the system 2000, set monitoring of health (e.g., fan speeds and CPU temperature limits), and/or provide a variety of other parameters that affect overall performance and power usage of the system 2000. While firmware 2034 is illustrated as being stored in the flash memory 2032, one of ordinary skill in the art will readily recognize that the firmware 2034 can be stored in other memory components, such as memory 2004 or ROM 2006.

System 2000 can include one or more sensors 2026. The one or more sensors 2026 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 2026 can communicate with the processor, cache 2028, flash memory 2032, communications interface 2024, memory 2004, ROM 2006, RAM 2008, controller 2010, and storage device 2012, via the bus 2002, for example. The one or more sensors 2026 can also communicate with other components in the system via one or more different means, such as inter-integrated circuit (I2C), general purpose output (GPO), and the like. Different types of sensors (e.g., sensors 2026) on the system 2000 can also report to the controller 2010 on parameters, such as cooling fan speeds, power status, operating system (OS) status, hardware status, and so forth. A display 2036 may be used by the system 2000 to provide graphics related to the applications that are executed by the controller 2010.

FIG. 21 illustrates an example computer system 2100 having a chipset architecture that can be used in executing the described method(s) or operations, and generating and displaying a graphical user interface (GUI). Computer system 2100 can include computer hardware, software, and firmware that can be used to implement the disclosed technology. System 2100 can include a processor 2110, representative of a variety of physically and/or logically distinct resources capable of executing software, firmware, and hardware configured to perform identified computations. Processor 2110 can communicate with a chipset 2102 that can control input to and output from processor 2110. In this example, chipset 2102 outputs information to output device 2114, such as a display, and can read and write information to storage device 2116. The storage device 2116 can include magnetic media, and solid state media, for example. Chipset 2102 can also read data from and write data to RAM 2118. A bridge 2104 for interfacing with a variety of user interface components 2106, can be provided for interfacing with chipset 2102. User interface components 2106 can include a keyboard, a microphone, touch detection, and processing circuitry, and a pointing device, such as a mouse.

Chipset 2102 can also interface with one or more communication interfaces 2108 that can have different physical interfaces. Such communication interfaces can include interfaces for wired and wireless local area networks, for broadband wireless networks, and for personal area networks. Further, the machine can receive inputs from a user via user interface components 2106, and execute appropriate functions, such as browsing functions by interpreting these inputs using processor 2110.

Moreover, chipset 2102 can also communicate with firmware 2112, which can be executed by the computer system 2100 when powering on. The firmware 2112 can recognize, initialize, and test hardware present in the computer system 2100 based on a set of firmware configurations. The firmware 2112 can perform a self-test, such as a POST, on the system 2100. The self-test can test the functionality of the various hardware components 2102-2118. The firmware 2112 can address and allocate an area in the memory 2118 to store an OS. The firmware 2112 can load a boot loader and/or OS, and give control of the system 2100 to the OS. In some cases, the firmware 2112 can communicate with the hardware components 2102-2110 and 2114-2118. Here, the firmware 2112 can communicate with the hardware components 2102-2110 and 2114-2118 through the chipset 2102, and/or through one or more other components. In some cases, the firmware 2112 can communicate directly with the hardware components 2102-1410 and 2114-2118.

It can be appreciated that example systems 2000 (in FIG. 20) and 2100 can have more than one processor (e.g., 2030, 2110), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A virtual desktop system comprising:
   a plurality of available cloud regions that each include desktop agents, gateways, and associated resources for providing a pool of virtual desktops to client devices of a plurality of users;
   a monitoring service coupled to the available cloud regions, the monitoring service operable to collect constraint data from the plurality of available cloud regions and operational data from the desktop agents and the client devices;
   a desktop pool resource management engine coupled to the available cloud regions, the desktop pool resource management engine operable to:
      produce a cloud usage profile for at least one subset of the plurality of users based on the operational data from desktop agents and client devices;
      create a priority list of the plurality of available cloud regions for a user in the subset of the plurality of users based on the usage profile and the constraint data of the available cloud regions; and
      recommend the highest priority cloud region from the priority list for the user of a client device requesting a desktop; and
   a control plane selecting a cloud region according to the priority list to provide the desktop to the client device.

2. The system of claim 1, wherein the usage profile is one of a plurality of usage profiles, wherein at least one of the plurality of usage profiles is associated with each of the plurality of users.

3. The system of claim 2, wherein the usage profile includes a user role and a user location.

4. The system of claim 2, wherein applications used by the user usage data determines the user role in the usage profile.

5. The system of claim 1, wherein the prioritized list is created by analyzing each of the plurality of cloud regions with regard to the suitability for the usage profile and comparing each of the cloud regions in relation to the suitability.

6. The system of claim 5 wherein the creation of the priority list is based on one of a static configuration specified by an administrator; a statistical method of ranking the regions to optimize specific profiles; a rule-based system, or a machine learning technique, or a combination thereof.

7. The system of claim 1, wherein the desktop pool resource management engine is operable to determine whether the selected cloud region satisfies a runtime criteria, wherein the next prioritized region is considered if the initial selected region does not satisfy the runtime criteria.

8. The system of claim 7, wherein the runtime criteria includes one of network health and resource availability.

9. The system of claim 1 wherein the constraints include at least one of provider, location, carbon rating, predicted status, predicted capacity, predicted initial latency, subsequent latency and cost.

10. The system of claim 1, wherein the operational data includes at least one of location of the user, duration of connection, and applications used by the desktop.

11. The system of claim 1, wherein the desktop pool resource management engine is operable to assign a weight to the constraints to express relative importance of the consideration factor.

12. The system of claim 1, wherein the control plane is operable to determine a change in a condition of the plurality of cloud regions and wherein the desktop pool resource management engine is operable to reevaluate the priority list based on the changed conditions.

13. The system of claim 12, wherein the change in condition is the unavailability of one of the plurality of cloud regions.

14. The system of claim 1, wherein the desktop pool resource management engine is operable to predict the time to warm up a desktop in a region for the usage profile.

15. The system of claim 1, wherein the desktop pool resource management engine is operable to predict a quantity of desktops to be warmed up in a cloud region for the usage profile.

16. The system of claim 1, wherein the desktop pool resource management engine creates a warmup plan based on analysis of historical usage by the plurality of users.

17. The system of claim 1, wherein the desktop pool resource management engine is operable:
to assign a desktop to the client device of the user; and
provide a connection from the user to the assigned desktop based on the priority list of cloud regions.

18. The system of claim 17, wherein the desktop pool resource management engine includes a run-time latency-first policy that selects a cloud region from the priority list that provides a low-latency connection and a run-time response-first policy that provides a warmed-up desktop in a next available cloud region of the priority list.

19. A method for providing access to virtual desktops in a desktop pool to a plurality of users operating client devices, the method comprising:
collecting constraint data from a plurality of available cloud regions via a desktop pool resource management engine coupled to the available cloud regions, wherein each of the available cloud regions provide virtual desktops to the client devices via desktop agents, gateways, and associated resources;
collecting operational data from the desktop clients and desktop agents;
creating a cloud usage profile for at least a subset of the plurality of users based on the collected operational data from the desktop agents and client devices;
creating a priority list of the plurality of available cloud regions for a user based on the usage profile and the constraint data of the available cloud regions;
recommending the highest priority cloud region from the priority list for a user of a client device requesting a desktop; and
selecting a cloud region according to the priority list to provide the desktop to the client device.

20. The method of claim 19, further comprising predicting a quantity of desktops to warm up and a time to warm up desktops in a cloud region for the usage profile.

21. The method of claim 19, further comprising creating a warmup plan based on analysis of historical usage by the plurality of users.

22. The method of claim 19, further comprising:
assigning a desktop to the user; and
providing a connection from the client device of the user to the assigned desktop based on the priority list of cloud regions.

23. The method of claim 22, wherein the selecting a cloud region is based on a run-time latency-first policy that provides a cloud region that provides a low-latency connection.

24. The method of claim 22, wherein the selecting a cloud region is based on a run-time response-first policy that provides a warmed-up desktop in a next available cloud region.

25. A non-transitory computer-readable medium having machine-readable instructions stored thereon, which when executed by a processor, cause the processor to:
collect constraint data from a plurality of available cloud regions via a desktop pool resource management engine coupled to the available cloud regions, wherein each of the available cloud regions provide virtual desktops to client devices through desktop agents, gateways, and associated resources;
create a cloud usage profile for at least a subset of a plurality of users of the client devices based on the operational data from the desktop agents, gateways, and client devices;
collect operational data from the desktop clients and desktop agents;
create a cloud usage profile for at least a subset of the plurality of users;
create a priority list of the plurality of available cloud regions for a user based on the usage profile and the constraint data of the available cloud regions;
recommend the highest priority cloud region from the priority list for a user of a client device requesting a desktop; and
select a cloud region according to the priority list to provide the desktop to the client device.

* * * * *